Figure 15:
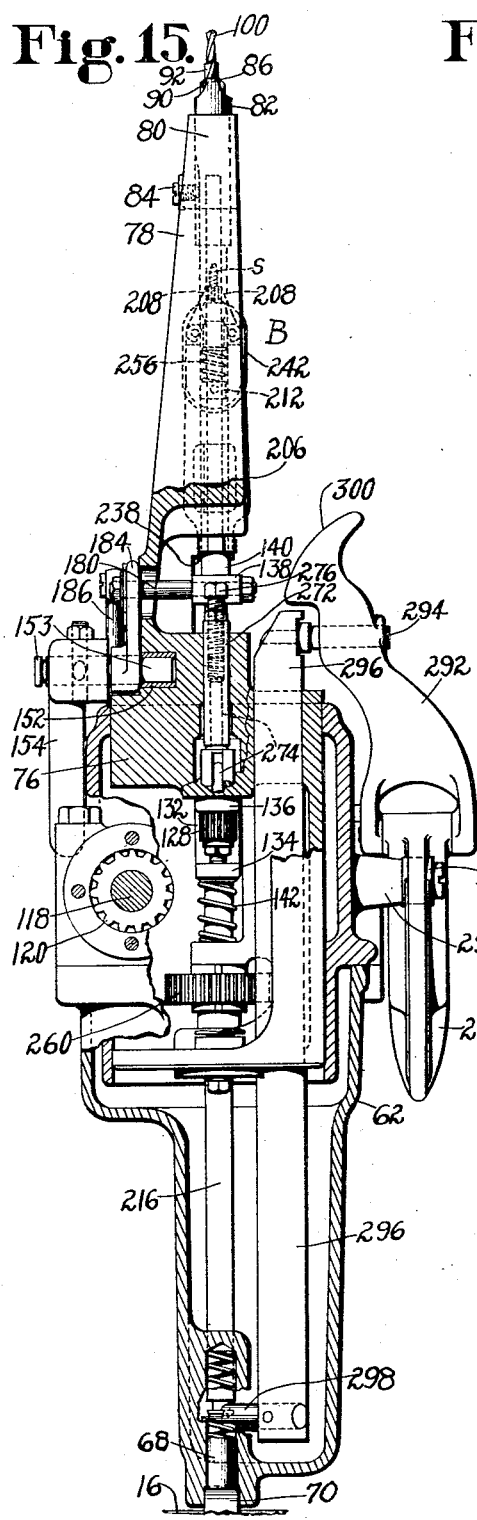

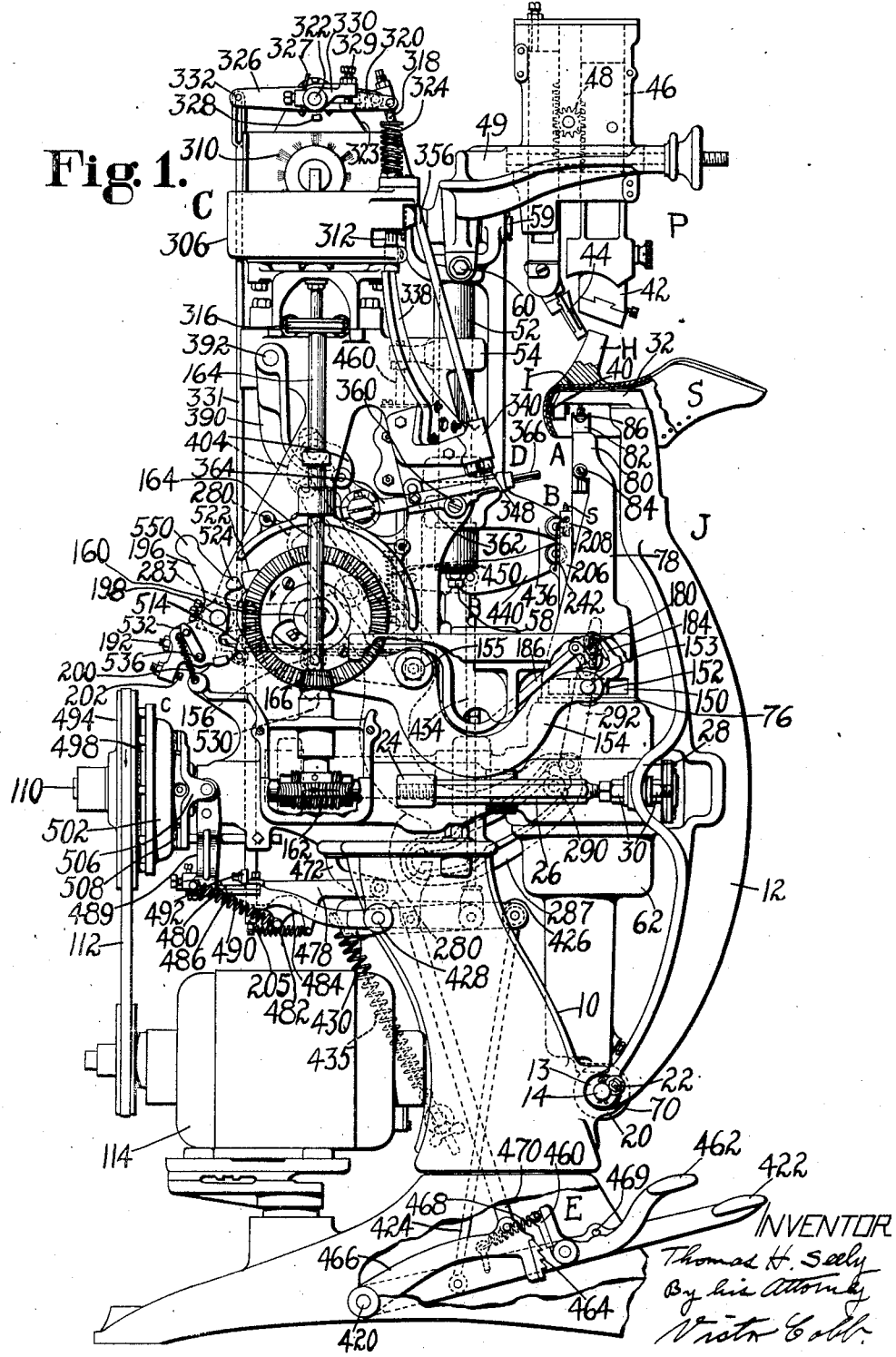

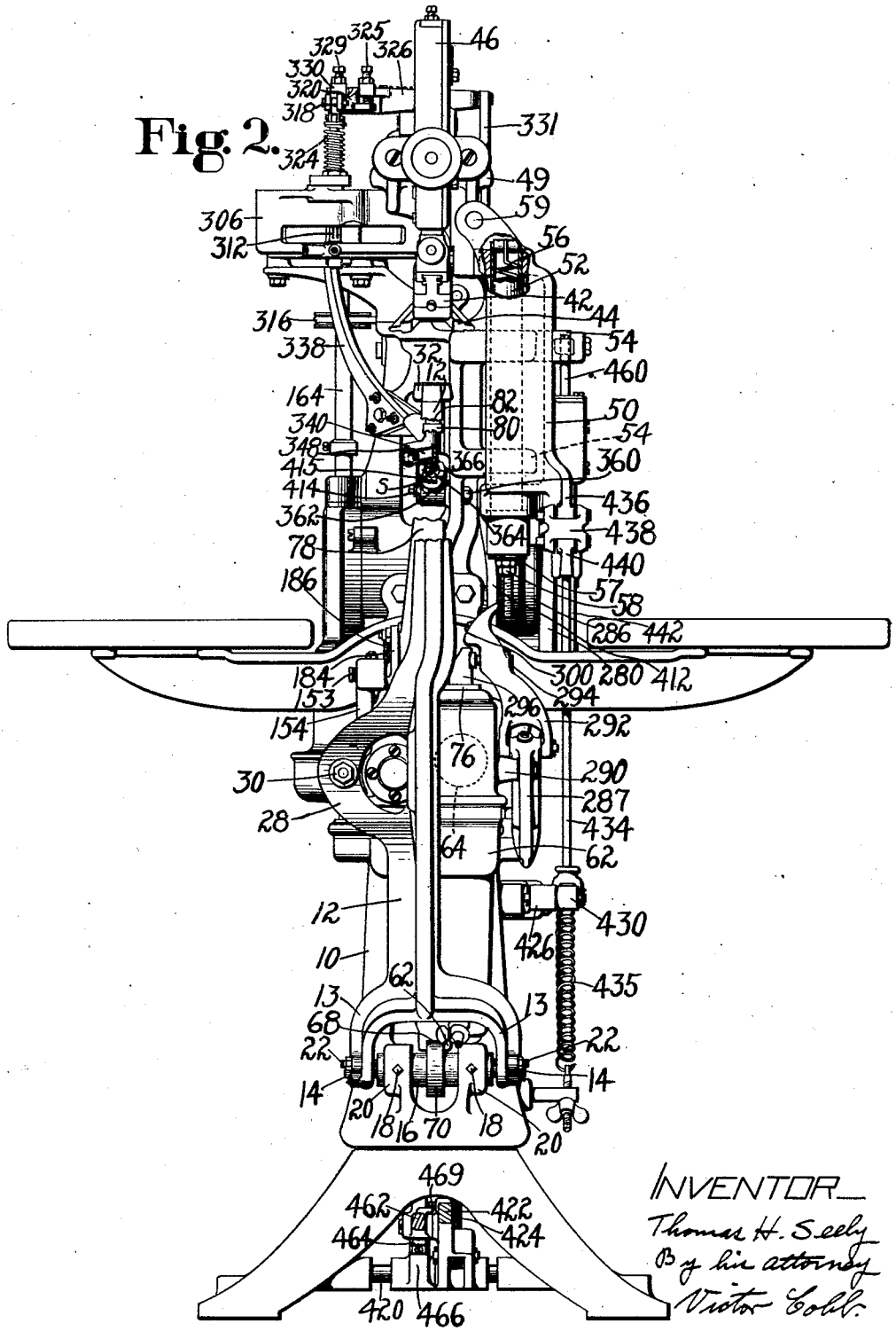

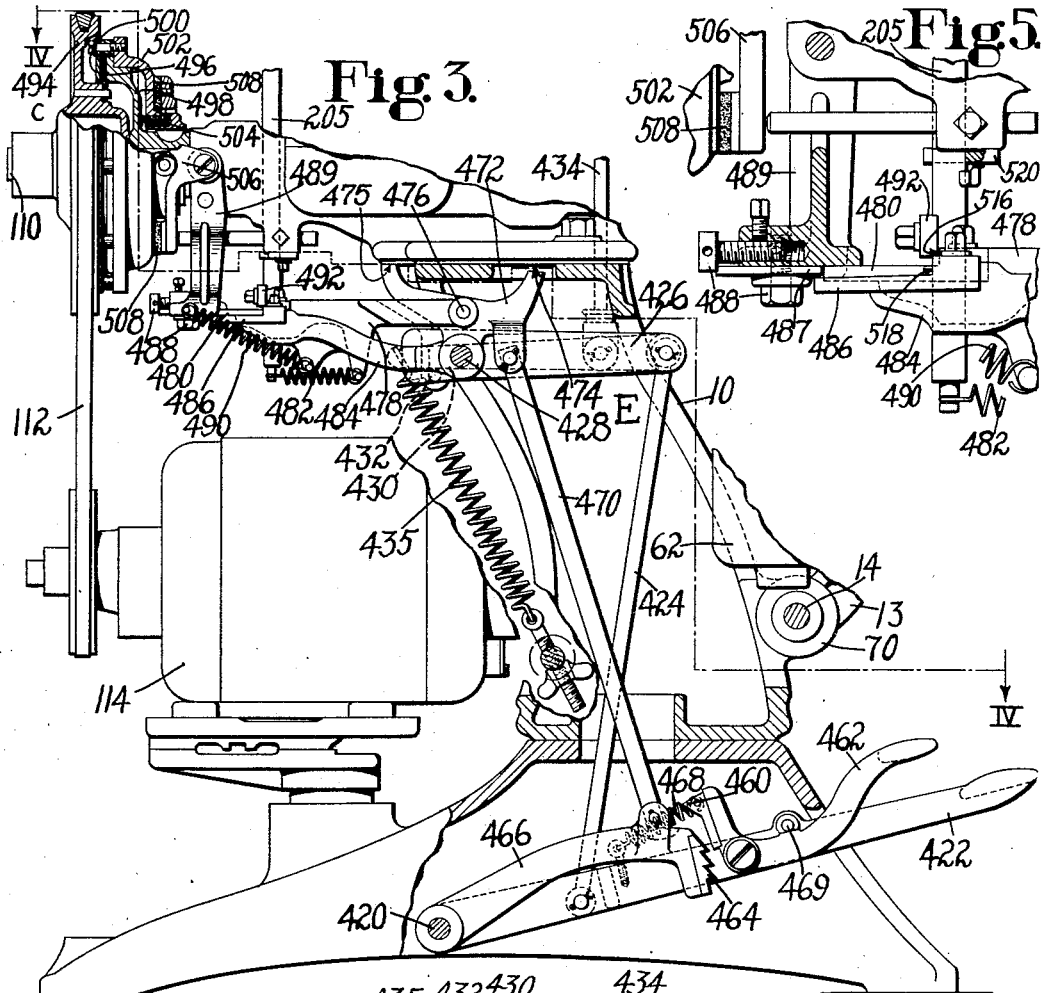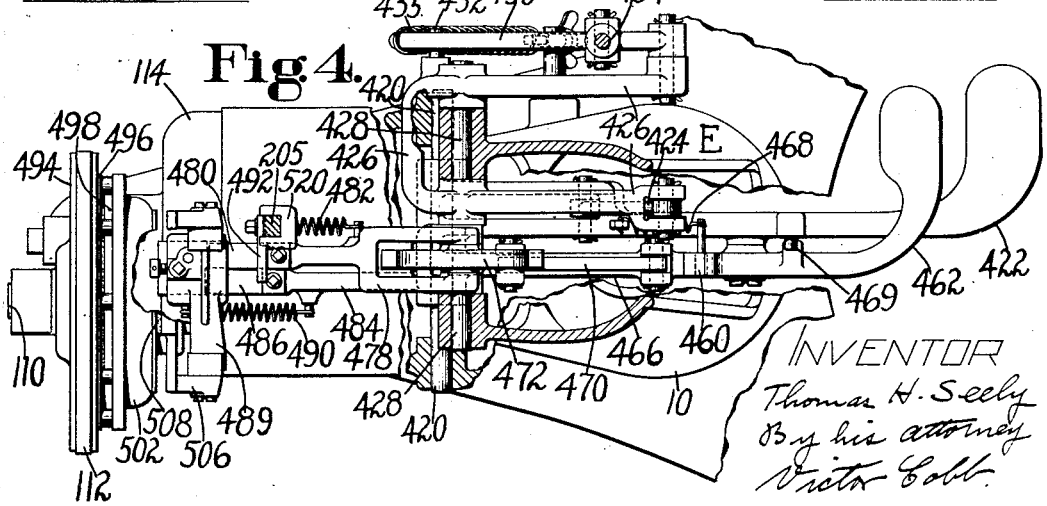

Oct. 3, 1939. T. H. SEELY 2,174,601
FASTENING-INSERTING MACHINE
Filed Nov. 13, 1936   14 Sheets-Sheet 4
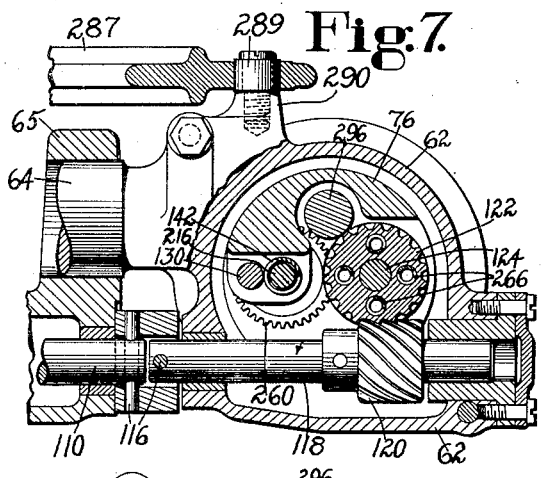
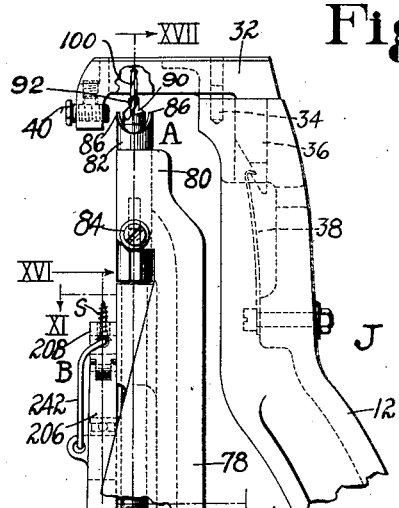
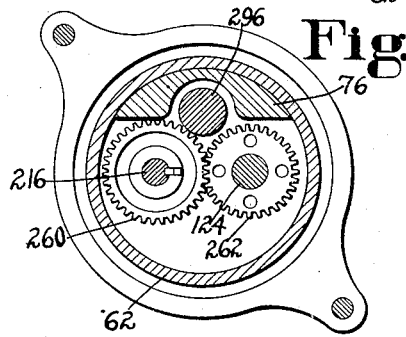
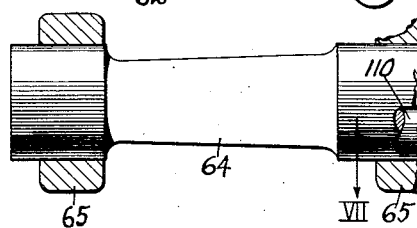
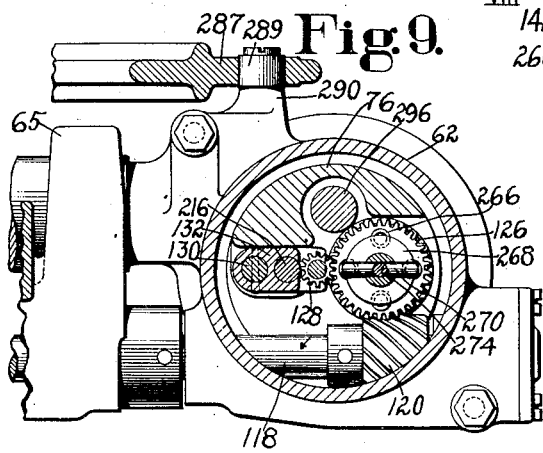
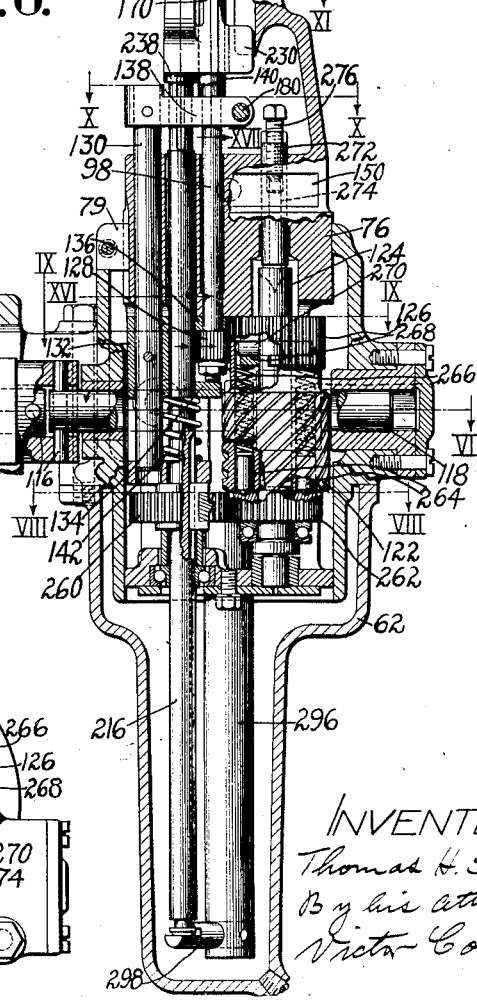
INVENTOR
Thomas H. Seely
By his attorney
Victor Cobb Oct. 3, 1939.  T. H. SEELY  2,174,601
FASTENING-INSERTING MACHINE
Filed Nov. 13, 1936  14 Sheets-Sheet 5
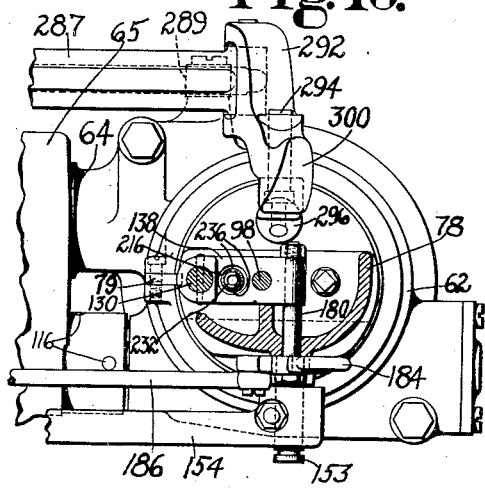
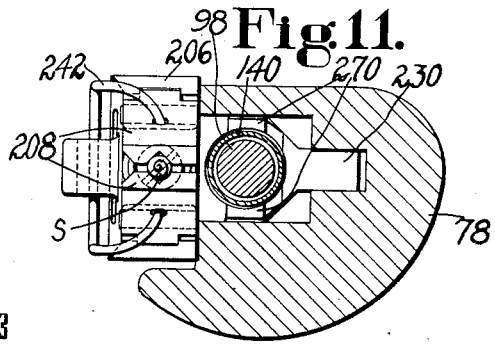
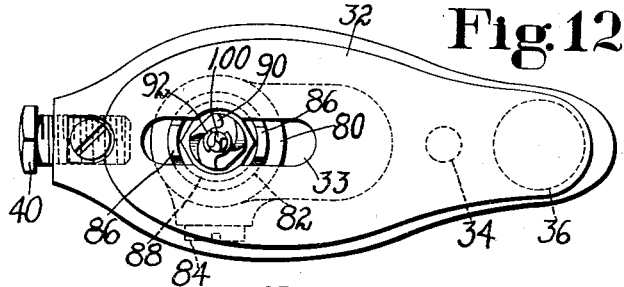
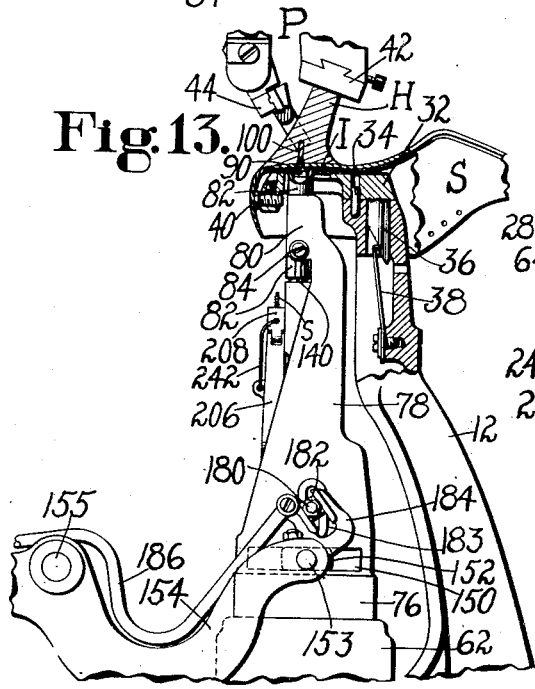
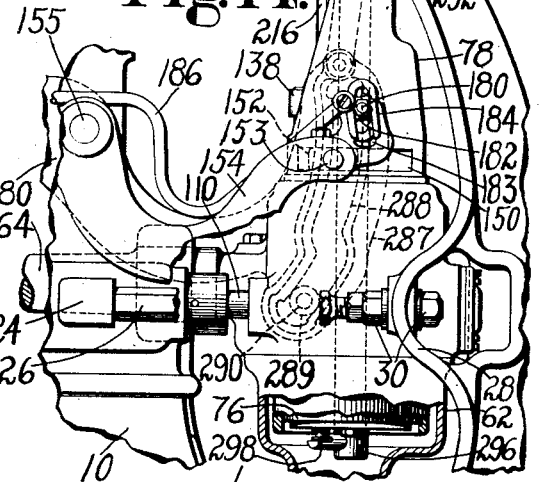

Oct. 3, 1939. T. H. SEELY 2,174,601
FASTENING-INSERTING MACHINE
Filed Nov. 13, 1936 14 Sheets-Sheet 6

INVENTOR
Thomas H. Seely
By his attorney
Victor Cobb

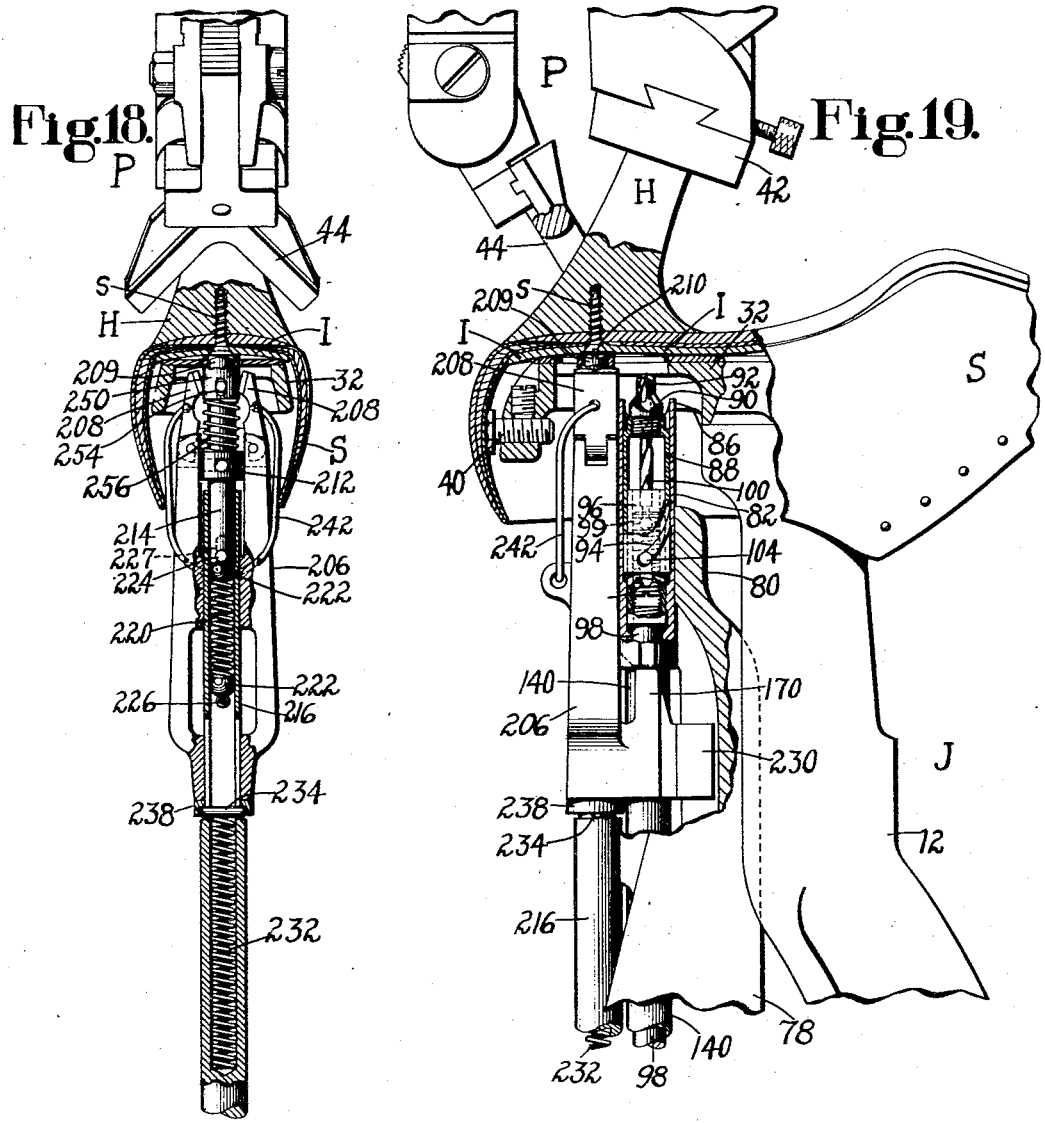
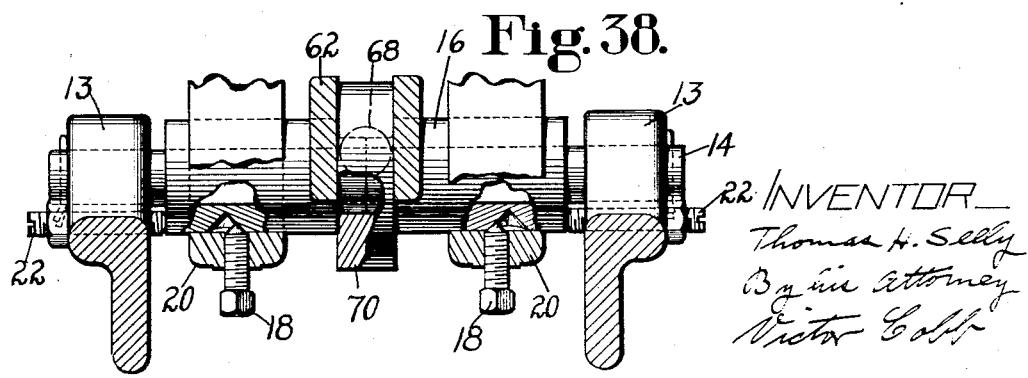

Oct. 3, 1939.  T. H. SEELY  2,174,601
FASTENING-INSERTING MACHINE
Filed Nov. 13, 1936  14 Sheets-Sheet 8
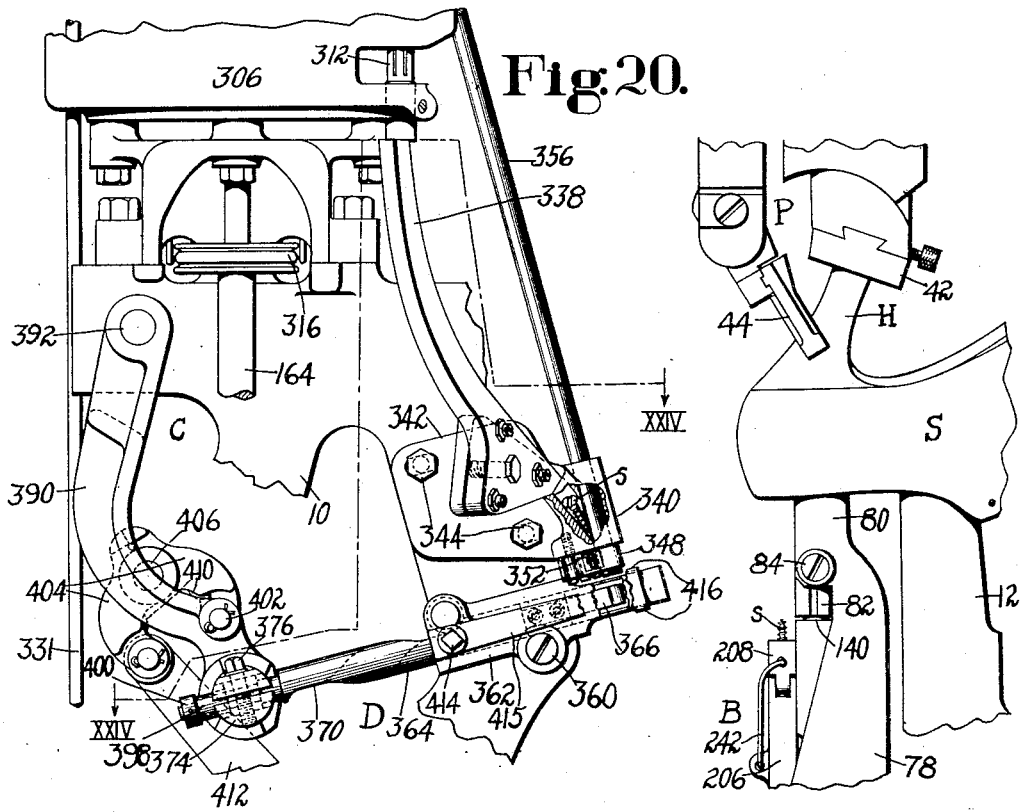
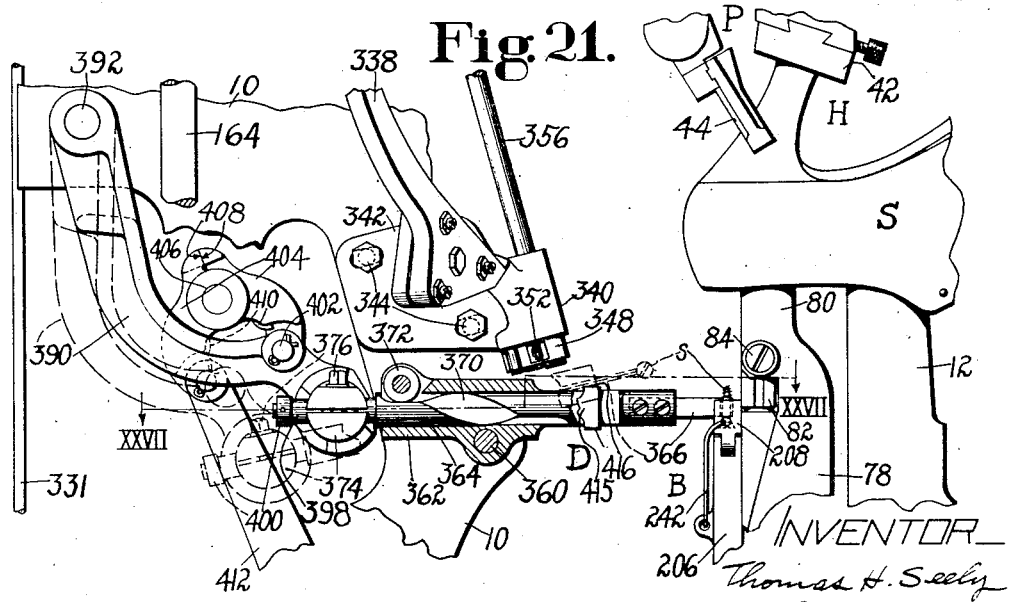

Oct. 3, 1939. T. H. SEELY 2,174,601
FASTENING-INSERTING MACHINE
Filed Nov. 13, 1936 14 Sheets-Sheet 9
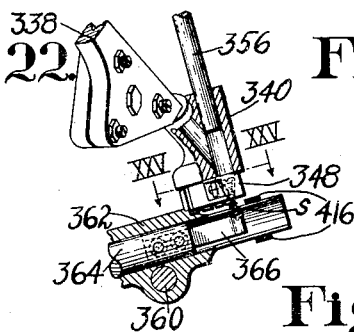
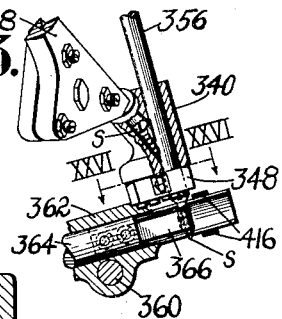
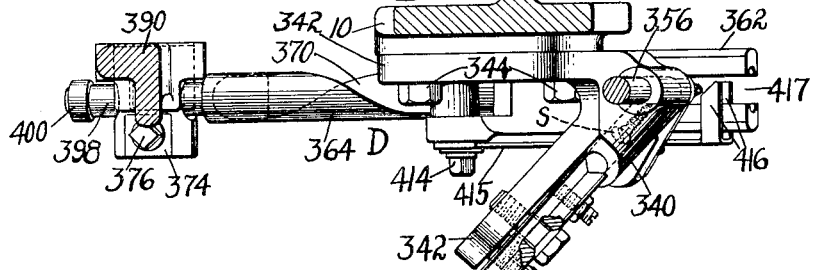
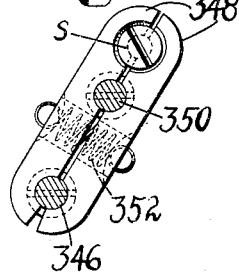
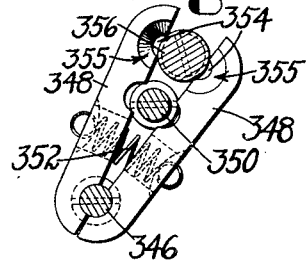
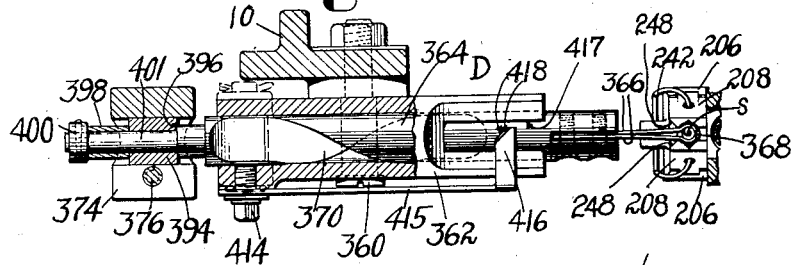
INVENTOR
Thomas H. Seely
By his attorney
Victor Cobb

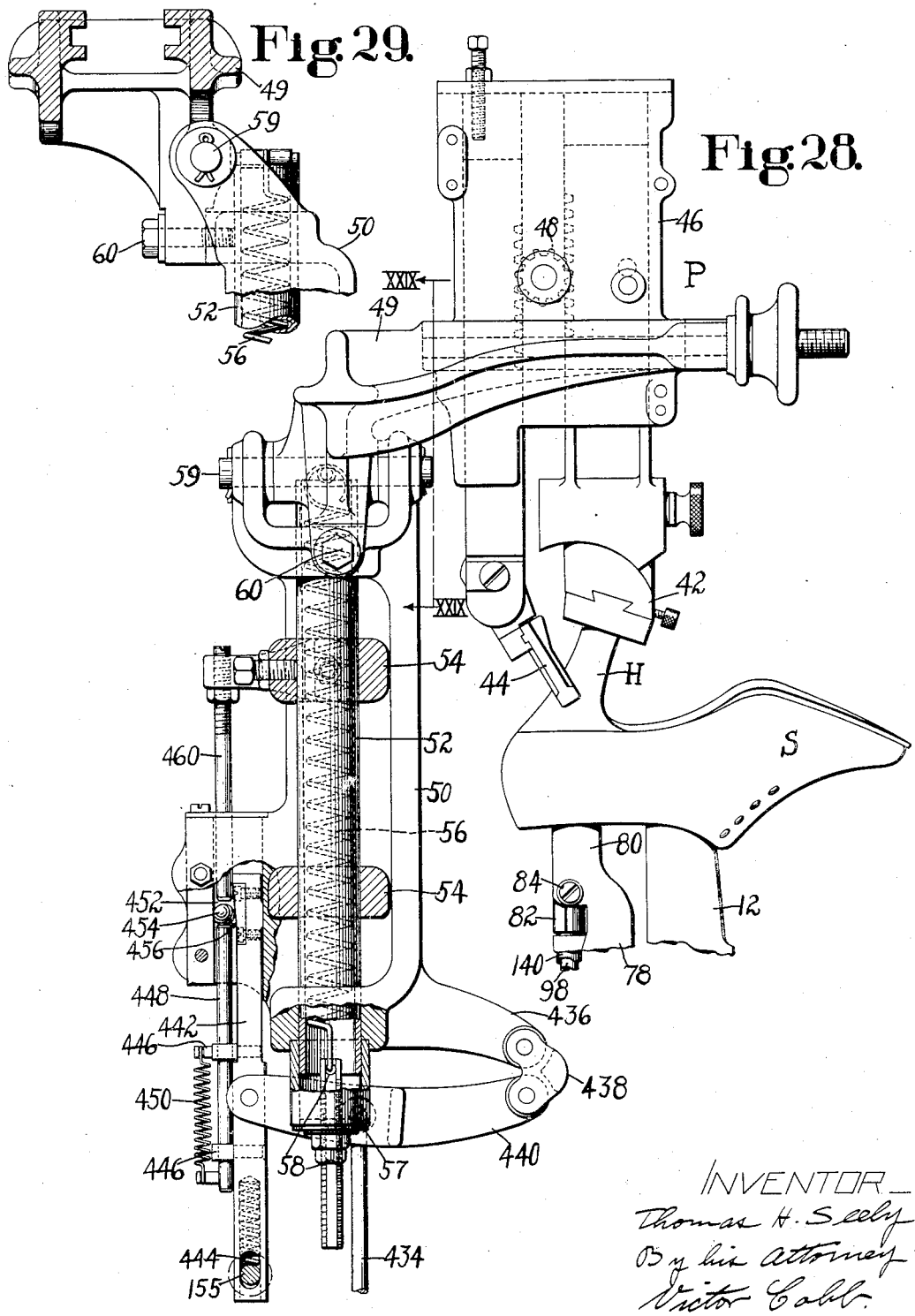

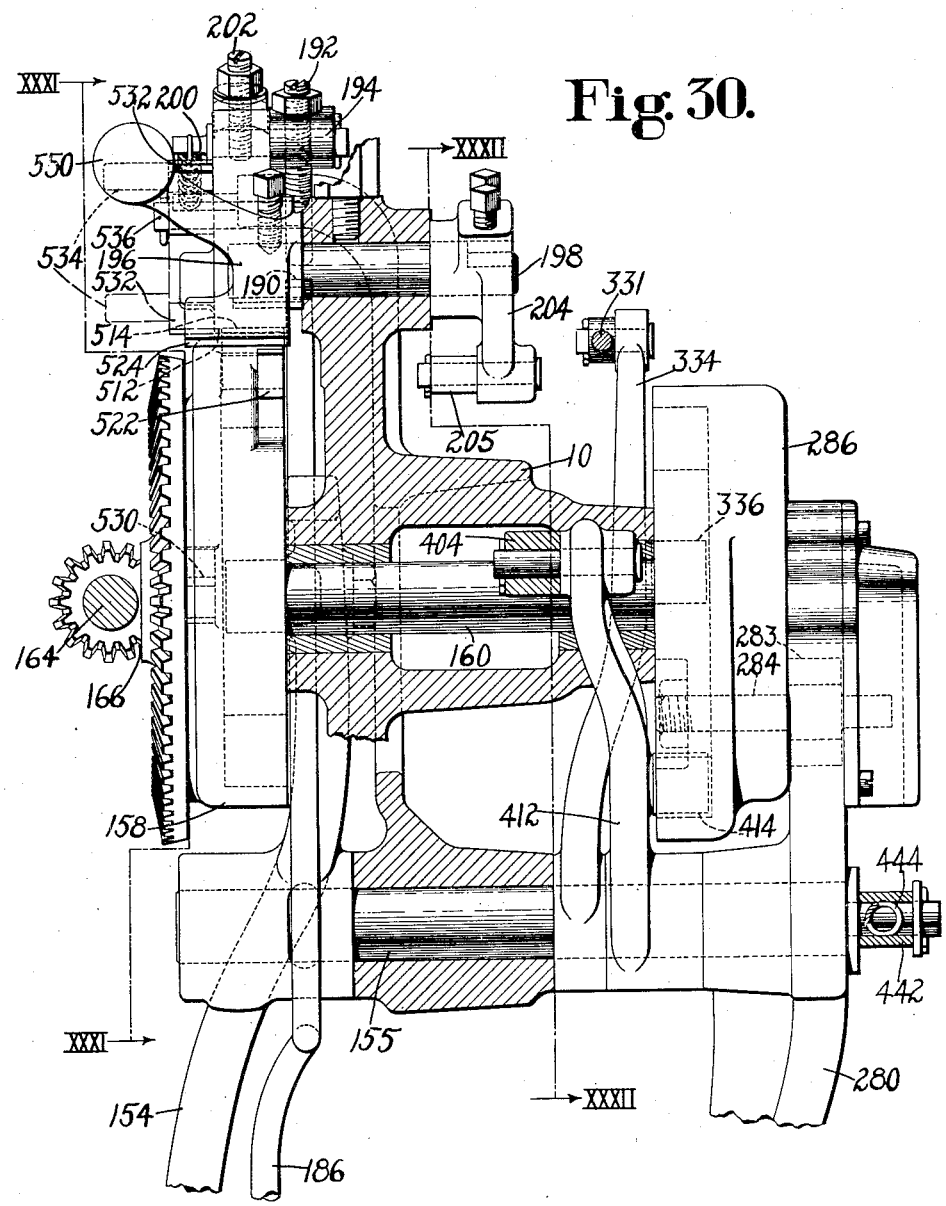

Oct. 3, 1939.  T. H. SEELY  2,174,601
FASTENING-INSERTING MACHINE
Filed Nov. 13, 1936  14 Sheets-Sheet 12

INVENTOR
Thomas H. Seely
By his Attorney

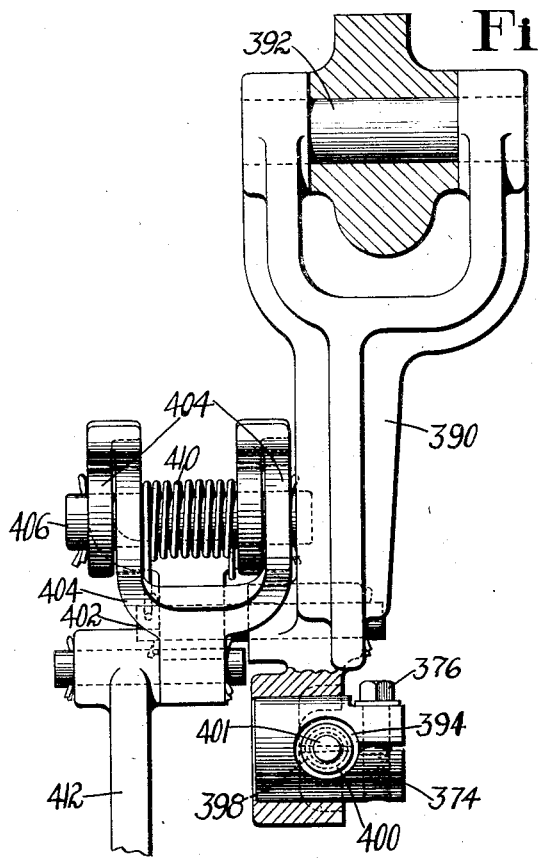
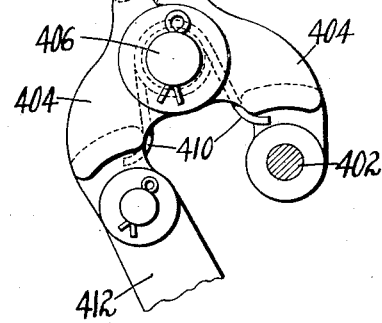

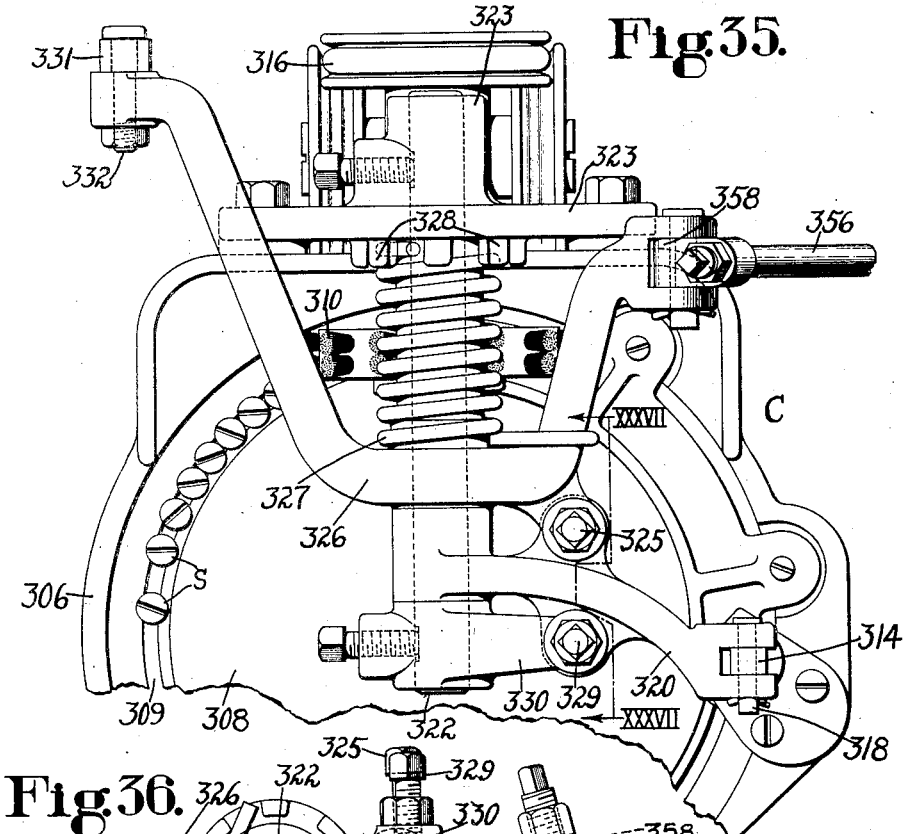

Patented Oct. 3, 1939

2,174,601

UNITED STATES PATENT OFFICE 2,174,601

FASTENING-INSERTING MACHINE

Thomas H. Seely, Melrose, Mass., assignor to United Shoe Machinery Corporation, Paterson, N. J., a corporation of New Jersey Application November 13, 1936, Serial No. 110,696

112 Claims. (Cl. 12—42)

My invention relates to machines for inserting fastenings in work-pieces, it being particularly concerned with the attachment of heels to shoes, and, in this connection, involving the preparation of the work by producing a hole through the heel-seat of a shoe into an applied heel and the completion of the attachment by setting a screw or like fastening into the hole thus formed. The hole-producing or drilling mechanism, per se, is made the subject of a divisional application filed in the United States Patent Office in my name on September 1, 1937, with the Serial Number 161,988.

In the securing of wood heels by fastenings applied from within shoes; a common practice is to employ wood-screws, first, by the use of one machine, drilling through the heel-seat into a heel positioned thereon to receive a screw, and then transferring the work to a second machine and, by its use, countersinking the drilled hole for the screw-head and inserting the screw in the prepared work. It is an object of this invention to eliminate the double handling and the necessity for care in presenting the work to the tools, thereby increasing the production-rate and lessening the operating cost.

As a feature of the invention by which this end is achieved, I combine with a support, as a jack for a shoe or other work-piece, means, which may include a drill, counter-drill and countersink, for forming a hole in the supported work, means, as a screw-driver, for inserting a screw or other fastening in this hole, and means which produces a relative movement between the support and the two operating means, whereby said means may act successively along the same operating axis. The insertion of the fastening is thus rendered automatic, being performed during a single operating cycle of one machine without change in the position of the work upon its support, the fastening and its inserting means being accurately presented to the hole previously formed. One operation may therefore better effect the formation of the opening and the insertion of the fastening in substantially half the time previously required. To hold the work upon the support for the operations of the tools upon it, pressure means actuated by the operator is preferably employed, this actuation also causing the initiation of an automatic operating cycle of the machine. To reduce the time required for the operations, the forming and inserting means are preferably rotated continuously during an operating cycle and are reciprocated simultaneously toward and from their operating positions. I prefer to rotate the forming means and communicate the rotation therefrom to the inserting means through means releasable by resistance encountered. In this way, by a simple and compact arrangement, the normally continuous rotation of both operating means may be maintained until that of the inserting means or screw-driver is temporarily stopped at the termination of the operating cycle, when the screw has been fully set in the work. Since a tool may encounter an obstruction in the work interfering with advance, I prefer to include means, which the tool itself controls, for rendering ineffective the means from which the tools are actuated. Thus, more specifically, if in drilling through the heel-seat of a shoe, a shank-reinforcement is struck, the driving means for the operating mechanism may be disconnected before injury to the drill results.

As another feature of the invention, the fastenings are delivered one by one from a mass contained in a feeder and transferred to the inserting means for application to the holes produced by the forming means. In the present embodiment of the invention, this supply of fastenings by the transferring means to the inserting means is made during the travel of the latter into or out of active position. Because it is convenient to feed the fastenings points first as they are taken from the mass and to insert them points up in the work, I invert said fastenings while they are being transferred. It is to be noted that this supply of the fastenings for inserting in the formed holes is made without other attention on the part of the operator than the maintaining of an adequate quantity in the feeding means, all the operations of delivery, transfer and inversion being purely automatic.

Since the work applied to the support may be of such a character, as a leg-boot, that it will interfere with the delivery of fastenings to the inserting means, means is preferably provided, as a further feature of the invention, for dividing the operating cycle, there being means which may be set by the operator and which will cause the machine to stop before the completion of said cycle. In this way, a previously delivered fastening may be inserted during one portion of a cycle, the machine automatically stopped, the completed interfering work removed, and the machine again started by the operator to deliver the fastening unobstructed, for insertion during the remainder of the cycle.

Other features of the invention involve the adjustment of the work-support or jack with respect to the operating mechanisms; the manner of supporting the tools by which the forming and inserting operations are carried out; the imparting of movements of rotation and reciprocation to the inserting means or screw-driver, and including a driver-assembly by which the screw is both grasped for presentation to the previously formed hole and is inserted in the work; the organization by which the tools, as the drill and screw-driver are successively brought into operating relation to the work-support; various combinations of feeder, transferring means and inserting means by which fastenings are taken one by one from a mass, delivered to the transferring means and supplied to the inserting means, preferably with inversion of the fastenings during transfer; means for applying pressure to the work to resist the action of the operating mechanisms; and means by which operation of the machine is controlled, both as to a continuous and a divided operating cycle.

Figure 16:
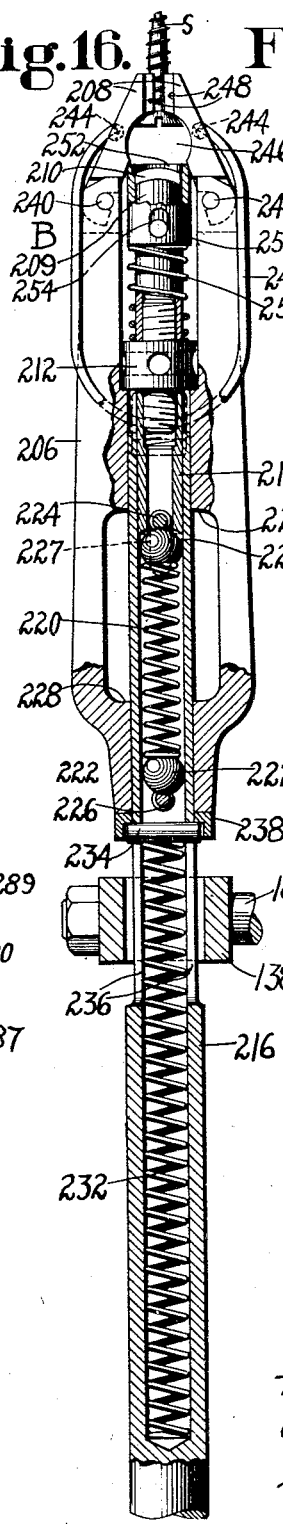
Figure 17:
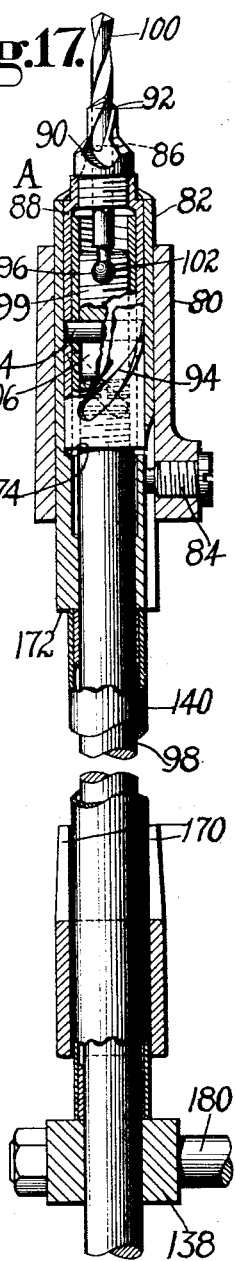
Figure 31:
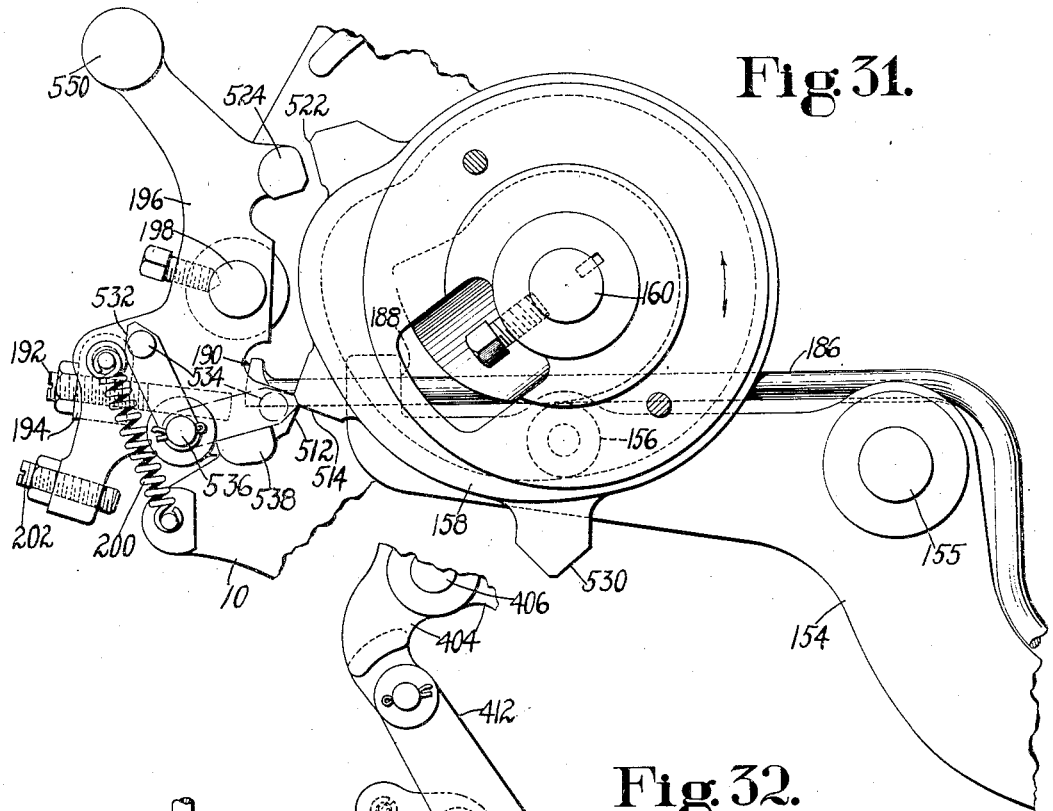
Figure 32:
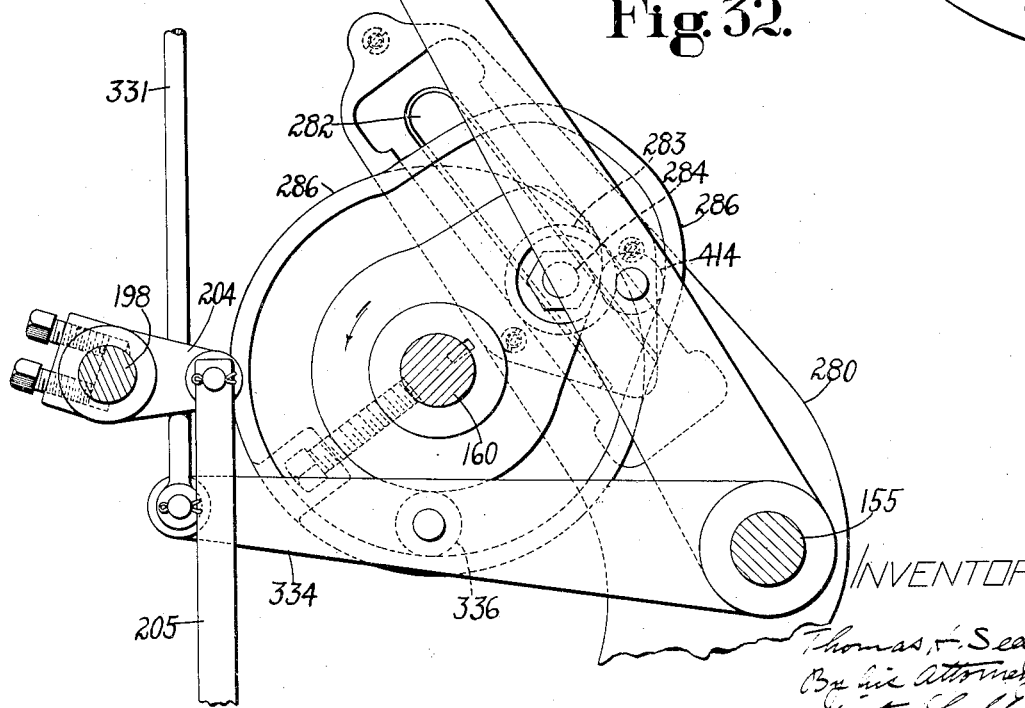

In the accompanying drawings is illustrated one of the many possible embodiments of this invention. Here, Fig. 1 shows the improved machine in side elevation;

Fig. 2 is a front elevation thereof;

Fig. 3, an enlarged, broken, side elevation of the treadle and the clutch-controlling mechanism;

Fig. 4, a horizontal section on the line IV—IV of Fig. 3;

Fig. 5, a detail in side elevation of the clutch-controlling mechanism;

Fig. 6, an enlarged, sectional elevation through the drilling and screw-inserting assembly;

Figs. 7 to 11, full horizontal sections on the lines VII—VII to XI—XI, respectively, of Fig. 6;

Fig. 12, a top plan view of the work-supporting jack;

Figs. 13 and 14, broken, side elevations of the operating mechanisms and jack, they respectively showing the drilling mechanism and the screw-inserting mechanism in action;

Fig. 15, a view, partially in elevation and partially in section, looking from the right of Fig. 6, the jack being omitted;

Figs. 16 and 17, vertical sections on the lines XVI—XVI and XVII—XVII of Fig. 6;

Fig. 18, a partial, vertical, transverse section through the screw-inserting mechanism;

Fig. 19, a broken, vertical section through the upper portions of the drilling and screw-inserting mechanisms, looking from the side opposite that from which Fig. 6 is taken;

Fig. 20, a detail in broken, side elevation, chiefly involving the transfer mechanism shown in its screw-receiving position;

Fig. 21, a similar view of the transfer mechanism in its screw-delivering position;

Figs. 22 and 23, vertical, sectional details through the delivery-nozzle, including a portion of the transfer mechanism and showing succeeding positions of the elements;

Fig. 24, a horizontal section on the line XXIV—XXIV of Fig. 20;

Figs. 25 and 26, sectional details upon the lines XXV—XXV and XXVI—XXVI of Figs. 22 and 23, respectively;

Fig. 27, a horizontal section on the line XXVII—XXVII of Fig. 21;

Fig. 28, an enlarged, broken, side elevation of the pressure mechanism;

Fig. 29, a vertical, sectional detail on the line XXIX—XXIX of Fig. 28;

Fig. 30, an enlarged, irregular section taken through the cam-shaft;

Figs. 31 and 32, vertical sections on the lines XXXI—XXXI and XXXII—XXXII, respectively, of Fig. 30;

Fig. 33, an enlarged, sectional detail, especially illustrating the actuating connections for the transfer mechanism;

Fig. 34, a side elevation of a yieldable portion of such connections;

Fig. 35, a broken, top plan view of the screw-feeding mechanism;

Fig. 36, a broken, side elevation thereof;

Fig. 37, a vertical, sectional detail on the line XXXVII—XXXVII of Fig. 35, and

Fig. 38 (to be found on the sheet with Figs. 18 and 19), an enlarged, broken, horizontal, sectional detail taken just above the spindle which supports the jack and the operating assembly.

The machine has four devices or mechanisms which more directly co-operate with the work. These consist of a jack J upon which a shoe S and a heel H being operated upon are supported; a pressure mechanism or head P for holding the work in place upon the jack; and operating means, including a mechanism A by which a hole is produced in the heel-seat of the jacked shoe and in the heel applied thereto and this hole counterbored and countersunk, and a mechanism B by which a screw $s$ or like fastening is inserted in the thus prepared hole. The means which prepares the work for the insertion, as well as that which effects it, both may be looked upon as inserting mechanisms. There is also a feed mechanism C by which the fastenings are supplied, one by one, from a mass for such insertion, together with a transfer mechanism D, which receives fastenings from the feed mechanism and delivers them to the inserting mechanism at the jack, and a treadle mechanism E by which the operations of the apparatus are controlled.

Considering first the mechanisms J and P which position and retain the work for the operations upon it, the jack J comprises an arm 12 pivotally mounted by forked portions 13, 13 upon a spindle 14 carried in a horizontal sleeve 16. The sleeve is secured by set-screws 18, 18 in spaced lugs 20, 20 projecting from the lower portion of the frame (Figs. 1, 2 and 38) and is shown as divided transversely at its center for convenience in assembling. To locate the jack in the proper transverse relation to the operating mechanisms A and B, it may be shifted with its spindle longitudinally of the sleeve by screws 22, 22 threaded through the arm-portions 13 and bearing at their opposite extremities against the ends of the sleeve. Means is provided for supporting the jack J in a definite position with respect to the operating mechanisms, while permitting such position to be varied from front to rear of the machine. A lug 24 projects from one side of the frame 10, and from this there extends outwardly a horizontal bar 26 provided with a threaded end passing through an opening in a wall 28 curved inwardly at one side of the arm 12 (Fig. 14). Upon the threaded end of the bar and bearing against opposite sides of the wall are nuts 30, 30. By alteration in the position of these nuts, the arm 12 may be turned angularly upon the spindle 14 and locked. The transverse and fore-and-aft adjustments allow the jack, and consequently a predetermined portion of the supported work, to be brought into the correct relation to that vertical line, or operating axis, along which occur the boring and fastening-inserting operations of the mechanisms A and B. This operating axis coincides with the section-line XVII—XVII of Fig. 6. As is well shown in Figs. 6, 12 and 13, the arm 12 has upon its upper extremity a top-plate 32 which furnishes the direct support for the shoe to which a heel is to be attached and in which is a slot 33 having a central enlargement through which the tools of the mechanisms operate. The plate, as to its horizontal contour, generally conforms to the counter-portion of a shoe. It is preferably removable to enable the operator to employ plates of different size, so there may not be too much opportunity for lateral movement of the work upon the jack. To permit this interchange, a dowel-pin 34 rises from the end of the arm 12 and is received in an opening in the plate. In front of this opening in the plate is a depending latch-pin 36 entering a socket in the arm. A spring 38 secured to the arm and accessible through an opening in the front thereof extends into the socket and engages the pin 36 to latch the top-plate in place. A screw 40 threaded horizontally through a depending portion of the plate furnishes, by its projecting head, an adjustable back-stop to locate properly upon the jack, with reference to the operating mechanisms, the particular size and style of shoe being operated upon.

To a considerable extent, the pressure mechanism P (Fig. 29) is shown as in Letters Patent of the United States of America No. 1,269,554, Standish, June 18, 1918. It is characterized by tread and rear abutments 42 and 44 sliding vertically in a casing 46 and connected by compensating means 48. The casing is carried by an arm 49 projecting horizontally from a slide 50, movable but retained against turning upon a guide-sleeve 52 fixed vertically in projections 54, 54 from the frame. A spring 56, supported at its upper end on the sleeve and extending therethrough, is secured to a downward extension 57 from the slide to hold the pressure-head normally raised. A connection at 58 between the spring and slide-extension is threaded to allow the sustaining force of the spring to be altered. The arm 49 may be pivoted upon the slide at 59 and releasably locked to it by a screw 60. By this means, the pressure-head may be freed and swung back to give ready access to the elements beneath it. The manner in which the mechanism P is actuated to apply pressure to the work and to release it will be described later.

For general illustration of the operating mechanisms A and B, reference may be had to Figs. 6 and 15 to 19, inclusive. A casing 62 supports the mechanisms with their tools alined in a vertical plane extending from front to rear of the machine. The casing upon its back wall has a horizontal projection 64 which is guided at 65, 65 in the frame 10 to move longitudinally, transversely of the jack J. To furnish an auxiliary support for this casing, its lower end is grooved (Fig. 15) to receive a roll 79 rotatable about a reduced portion of the sleeve 16 (Fig. 38). At the top of the groove, a spring-plunger 68 yieldable vertically in the casing rests upon the roll. The yield of the plunger is sufficient to compensate for a lack of perfect spacing and parallelism between this lower supporting surface and the bearing surfaces of the casing-projection 64. The sleeve and roll may be shifted transversely to turn the casing slightly about the axis of the projection 64 and alter the direction in which the tools carried thereby act. This is effected by the screws 18, threaded through the frame-lugs 20 and which have conical ends bearing upon complemental depressions in the sleeve-sections.

First, as to the drilling, counterdrilling and countersinking mechanism A, there is guided for vertical movement in the casing 62 a carrier-slide or cylinder 76 (Fig. 6) provided with an arm 78 extending upwardly from the body of the cylinder into proximity with the under side of the top-plate 32. A projection 79 from the casing entering a slot in the cylinder holds the latter against rotation. The arm 78 terminates in a guide-portion 80, in which is movable a gage-sleeve 82 maintained against rotation by a screw 84 threaded through the guide and entering a slot in the sleeve (Fig. 17). At the upper extremity of the gage-sleeve are spaced vertical projections or feet 86 which are adapted to rise through the jack-slot 33 for contact with the insole I of a shoe S being operated upon. The spaces between the feet facilitate the escape of the chips produced by the drilling and countersinking. Guided within the sleeve 82 is a shorter driving sleeve 88 having threaded fast upon its upper extremity a tubular countersink 90, from the top of which project opposite fingers 92, 92 furnishing a tubular counterdrill. Through the driving or countersink-sleeve 88 are two opposite inclined or helical slots 94, 94, each extending downwardly about said sleeve in a clockwise direction, as viewed from above. Movable along the passage through the countersink-sleeve is a drill-actuating sleeve 96, furnishing the terminal of a drill-shaft 98 upon which it is threaded. This shaft passes down through the arm 78 into the cylinder 76, where it has a bearing. Into the upper portion of the sleeve 96 is threaded a plug or holder 99 for a drill 100, which is joined to it by a ball-and-socket joint 102, so rotation of the shaft and this terminal-sleeve is without direct effect upon the drill. Through opposite alined openings in the sleeve 96, a pin 104 extends, this projecting at its ends into each of the slots 94 but lying within the sleeve 82, which maintains it against displacement. The plug 99 is partially divided by a vertical slot 106 to receive the pin 104. With the sleeves 88 and 96 removed from the apparatus, the pin 104 may be withdrawn, and the plug 99 turned by a tool inserted in a slot in its lower extremity. In this way, the normal height of the drill may be adjusted to compensate for sharpening. The counterdrill-fingers 92 lie within opposite flutes of the drill 100, so there may be relative longitudinal movement between the two, and when the shaft 98 is driven, the drill may be rotated by way of the terminal-sleeve 96, the pin 104, the countersink-sleeve 88 and the fingers 92. The first of these movements will cause the fingers to clear accumulated chips from the drill-flutes, while the second imparts to the drill its operating rotation.

The shaft 98 is rotated from a main driving shaft 110 of the machine (Figs. 1 and 6). This latter shaft is journaled horizontally in the frame 10 and receives power through belt-gearing 112 and a clutch c from a motor 114 carried at the base of the frame. At its forward extremity, the shaft 110 is united by a coupling 116 of the Oldham type, capable of transmitting both rotation and traction to a short shaft 118 turning in bearings in the casing 62. Upon the shaft 118 is an elongated spiral gear 120 (Fig. 7) meshing with a similar gear 122 upon a short, vertical countershaft 124 journaled in the cylinder 76.

Fast upon the shaft 124 above the gear 122 is a spur-gear 126 meshing with a pinion 128 secured to the lower extremity of the drill-shaft 98. By these connections, the drill-shaft is driven continuously during a cycle of operation of the machine. By the series of connecting elements already traced, the rotation is transmitted through the countersink-sleeve 88 and the counterdrill-fingers 92 to the drill 100, without interfering with their capacity for relative, longitudinal movement.

The drilling and countersinking elements are preferably raised and lowered, their operation upon the work being succeeded by their withdrawal, in the following manner. Mounted to slide in the cylinder 76 is a carrier-rod 130. Fixed to this rod is a yoke member 132 having a horizontal arm 134, upon which the shaft 98 rests, and a forked arm 136 projecting above the gear 128. Secured to the upper extremity of the rod above the cylinder 76 is an arm 138. This arm 138 supports a sleeve 140 surrounding the shaft 98 and acting as an extension of the gage-sleeve 82. The carrier-assembly or actuator 130, 132, 138 is sustained by a helical compression-spring 142 interposed between a portion of the cylinder 76 and the arm 134 of the yoke 132. The vertical movement of the drilling and countersinking elements of the mechanism A is effected through a corresponding movement of the cylinder 76 communicated to the carrier-assembly through the spring 142. At one side of the upper portion of the cylinder 76 is a slot 150, in which a block 152 is movable (Figs. 1 and 14). Pivoted to the block by a pin 153 is the forward end of a lever 154 fulcrumed upon the frame by a horizontal spindle 155. The opposite extremity of the lever carries a cam-roll 156 (Fig. 31). This roll operates in a groove in a cam-disk or member 158 secured to a shaft 160 journaled transversely of the rear of the frame 10 above the main shaft 110. Spiral gearing 162, a vertical shaft 164 and bevel-gearing 166 communicate the rotation of the shaft 110 to the cam-shaft 160. The action of the cam 158 causes the lever 154 to elevate the cylinder 76 in the casing 62 through a distance greater than is required for the mechaniism A to operate to the desired depth upon the work, whatever may be the curvature of the insole above the work-supporting plate 32 of the jack or the compressibility of the heel-seat-material. This movement is transmitted yieldably by the spring 142 to the carrier elements mounted upon the rod 130. The shaft 98 and the sleeve 140 are therefore elevated together. This continues until the gage-feet 86 have contacted with and compressed to a certain extent the heel-seat-material. When the resistance encountered is sufficient to stop the rise of the gage-sleeve, the spring 142 is compressed for the remainder of the upward movement of the cylinder 76. The lifting of the drill-shaft 98 by the yoke-arm 134 causes the successive drilling of the heel-seat and the heel and counter-drilling and countersinking of the heel-seat by the action of the tools 100, 92 and 90, respectively. The shaft 98 is rotating the sleeve 88 through the pin 104 while the counterdrill-arms 92 are turning the drill 100. Since the upward movement of the elements starts when the pin is in engagement with the upper ends of the sleeve-slots 94, and the drill is projected to its full extent, said drill and the counterdrill and countersink are all lifted together as a result of the elevation of the shaft. During this portion of the operation, these elevated tools bear a definite relation to the ends of the gage-feet 86 because of the actuation of said tools and gage-feet through surfaces of the unitary yoke member 132. Consequently, the depth to which all the tools act upon the work will be the same regardless of the relation of the insole I to the top-plate 32. After the lever 154 has thus caused the operation of the tools, the cam 158 swings it in the opposite direction to lower the cylinder 76. The yoke-arm 136 bearing upon the top of the gear 128, forces down the shaft 98 to withdraw the drill 100 from the work. The sleeves 88 and 82 descend with the drill, the tops of the slots 94 tending to remain against the pin 104. But in this downward movement, upward projections 170 carried by a member 206 of the screw-inserting mechanism B, to be hereinafter described, lie below the end 172 of the falling gage-sleeve 82, where it projects beyond the extension-sleeve 140. After the descent of the gage-sleeve, the projections 170 are lifted in the action of the inserting mechanism and contact with the shoulder 172. The sleeve 82 is thereby raised, bringing a shoulder 174 upon its interior against the end of the sleeve 88, carrying this up and forcing the counterdrill-projections 92 through the flutes of the drill. Said drill is permitted to turn about its longitudinal axis by the connection 102 to the shaft-plug 99. As a result of this, chips or other material retained within the flutes will be stripped therefrom, and the drill completely cleaned for the succeeding operation. Upon the initiation of such operation, when the shaft 98 rises, the weight of the sleeve 88 may be effective in holding said sleeve back, so the drill will assume its operating position projected from the counter-drill, as appears in Fig. 17. It may be, however, that waste will be retained between the drill and the counterdrill and countersink. This might bind these last-mentioned tools upon the drill, so they would be urged against the work prematurely and make too deep holes in the heel-seat. The resistance which the counterdrill and countersink meet as they engage the work tends to make them lag behind the drill, and this tendency is increased by the pressure applied by the rotating pin 104 to the inclined walls of the slots 94. The drill and the sleeve 88 will therefore quickly assume their normal relation, with the pin 104 against the upper ends of the slots, so the operation may proceed in the proper manner.

There may be abnormal conditions, as when the drill 100 strikes such an obstruction in the heel-seat as a steel shank-piece, that the resistance would cause breakage. This I prevent by automatically stopping the machine. Referring to Figs. 6, 10, 13 and 31, the arm 138 of the carrier-assembly has projecting laterally from its forward extremity a stud 180, about which is rotatable a block 182 movable along a slot 183 in a short arm 184 pivoted upon the pin 153 which joins the block 152 to the lever 154 and thereby actuates the carrier-cylinder 76. The slot 183 is inclined upwardly and rearwardly with respect to the path along which the block 152 travels during the drilling operation. Near its upper extremity, the arm 184 has articulated to it a rod 186 for controlling the clutch c and which extends rearwardly, supported at 188 to reciprocate upon the lever 154. At its inner end, the rod 186 has a vertically extended surface 190 (Fig. 31), which, at the period assumed in the operating cycle, is opposite the end of a screw 192. This screw is threaded through a lug 194 upon a lever 196 secured to a spindle 198 turning in the frame at the rear of the cam-shaft 160. In its normal position, a spring 200 joining the lever to the frame holds it with a limiting screw 202 against said frame. Also fast upon the spindle 198 is an arm 204 (Fig. 32), from which depends a link 205. Upon depression, this link is arranged to cause the opening of the clutch c (Fig. 3) and the consequent disconnection of the motor 114 from the driving shaft 110. The action of the clutch will hereinafter be described in detail. On account of the inclination of the slot 183, it will be evident that when the upward movement of the drill-shaft 98 is stopped in the manner previously indicated, travel of the block 152 and the cylinder 76 may continue under the influence of the lever 154, the spring 142 beneath the yoke 132 yielding. As a result of this differential movement, the block 182 tilts the arm 184 anticlockwise (Fig. 13), forcing the rod 186 rearwardly. The surface 190 of said rod will thereby be thrust against the screw 192, so the lever 196 is swung clockwise (Fig. 31) against the force of the spring 203. Consequent rotation of the spindle 198 lowers the link 205 to stop the machine and prevent injury to the drill. Obviously, such stopping of the machine should occur only during a particular interval in the operating cycle, this being in an intermediate portion of the drilling period and not at the termination, at which time there is an excess of upward movement of the cylinder 76. This is guarded against by so relating the rod 186 to the screw 192 that at this closing portion of the operation of the drill the angular movement of the lever 154 will have carried the rod-surface 190 past the end of the screw. Rearward thrust of the rod will therefore not affect the disconnecting mechanism.

The screw-inserting mechanism B (Figs. 1, 6, 11, 14, 15 and 16) consists more essentially of an assembly comprising the carrier 206 for screw-engaging and -presenting jaws 208, 208 and a screw-driver 209 provided with a bit 210 for entering the slot of a screw (Fig. 16). The screw-driver is coupled by a threaded connector 212 entering its tubular lower portion to a sleeve 214 movable longitudinally of and compelled to rotate with a vertical shaft 216 journaled in the carrier-cylinder 76. The sleeve is received by a tubular upper portion of the shaft. When sufficient resistance is encountered by the bit of the screwdriver, it may yield relatively to the shaft against a compression-spring 220 bearing at its opposite extremities against balls 222, 222 backed by horizontal abutment-pins 224 and 226 inserted through the walls of the sleeve and the shaft, respectively. The yieldability of the screw-driver provides for its continued engagement with the slot of a screw until said screw has been fully set in the work. The length of travel will vary according to the distance the insole of the shoe operated upon is from the top-plate 32 of the jack and the nature of the heel-seat-material. The pin 224 is extended from the sleeve 214 into vertical slots 227 in the shaft to cause these elements to turn together while moving relatively along their axes. The carrier 206 surrounds and bears upon the shaft 216 at 228 and is further guided and maintained against rotation by a projection 230 (Figs. 6 and 11) lying in a vertical groove in the cylinder-arm 78. The carrier is yieldable along the shaft 216, it being supported upon a spring 232 situated in said shaft below the spring 220. At its top, the spring is engaged by a horizontal abutment-pin 234 which extends through vertical slots 236, 236 in the shaft and at its ends outside the slots, carries a washer 238, which, in turn, furnishes a step-bearing for the carrier. Yield of the spring 232 upon arrest of the carrier permits the presentation of the screw through different distances to the hole which has been drilled in the work by the mechanism A, to there await the action of the screw-driver 209. The jaws 208 are respectively pivoted at 240 upon the opposite sides of the carrier 206 and are urged toward each other, so they may yield and receive a screw s between them, by a U-spring 242 provided with terminal-portions 244, 244 resting in sockets in the jaws 208 and supported by this engagement. The jaws approach each other to an extent determined by their contact with the upper portion of the carrier, there being left between them a space suitable to receive a screw. Between the jaws at 246 is a larger space into which the screw-head may be introduced, while at each side above this space are outwardly diverging surfaces 248, between which a portion of the screw-transferring means D may enter with the shank of a screw and part the jaws to receive it. To retain the screw against transverse displacement as it is engaged by the driver-bit, said bit is surrounded by a sleeve 250 provided with a cupped upper extremity 252 in which the screw-head may be seated. A slot-and-pin connection 254 compels the sleeve and driver to rotate together, and a spring 256, between the sleeve and a central enlargement of the connector 212 and upon which said sleeve rests, permits relative movement between it and the driver, as would occur after the sleeve has been stopped by contact with the insole of the shoe. The carrier 206 has rising from the rear of its lower portion the projections 170, previously referred to, for causing the clearing of the flutes of the drill 100.

During each operating cycle, the screw-driver-shaft 216 is continuously rotated. To this end, it extends downwardly through the carrier-arm 138 (Figs. 6 and 10) and through the casing 62, having splined upon it a gear 260, so supported upon the carrier cylinder 76 as to allow the shaft to reciprocate through it. This gear meshes with a gear 262 surrounding the countershaft 124 but free to turn independently thereof. The upper surface of the gear 262 has depressions in which rest the points of plugs 264 movable vertically in passages in the spiral gear 122 through which the drill-shaft 98 is driven. Above the plugs, the passages contain helical expansion-springs 266 (Fig. 9), which are backed by an abutment-washer 268 contained in a chamber within the drill-gear 126. The shaft 124 is slotted vertically, and through this slot passes a crossbar 270 resting upon the washer. Through the upper portion of the shaft 124 and through an extension 272 thereof is a vertical passage containing a rod 274 resting upon the crossbar. A screw 276 threaded into the upper end of the extension in alinement with the rod 274 may be turned to force down the washer 268 and variably compress the springs 266. By these driving connections, the screw-driver-shaft 216 may be rotated to transmit through the coupling at 262, 264 sufficient force to fully insert the screw in the work. After the screw-head has been seated in the countersunk depression in the insole, the plugs 264 yield and leave their depressions, so the coupling slips.

To reciprocate the shaft 216 vertically to shift the carrier 206 and the screw-driver 209 into and out of inserting position, I furnish means which also serves, in part, to reciprocate horizontally the casing 62 and the elements which it carries, thus bringing successively into operating relation the drilling mechanism A and the inserting mechanism B. For this arrangement, see particularly Figs. 1, 14, 15, 17, 30 and 32. Fulcrumed upon the spindle 155 at the opposite side of the frame from the drill-actuating lever 154 is a lever 280. Upon one arm of this lever (Figs. 30 and 32) is a longitudinal slot 282 in which operates a roll 283 surrounding a crank-pin 284 projecting from a cam-disk or member 286 upon the cam-shaft 160. The opposite arm of the lever (Figs. 14 and 15) has a lateral extension 287, in which is a cam-slot 288 receiving a roll 289 upon a projection 290 from the casing 62. Upon oscillation of the lever, this produces the desired horizontal movement of the casing to give the successive presentation of the operating mechanisms A and B, the casing-projection 64 sliding in the frame and the plunger 68 at the lower portion of said casing moving over the roll 70. To the upper end of the arm-extension 287 is pivoted a link 292 articulated at its opposite extremity to a pin 294 extending from a vertical actuating rod or slide 296 movable through the carrier-cylinder 76. At the bottom of the rod is a lateral extension 298, which furnishes a step for the shaft 216 and has therewith such opposite engagement that it may both push said shaft upwardly or pull it downwardly. The movement of the lever 280 through the connections just traced raises and lowers the shaft 216 with its screw-holding and -inserting elements. Upon the upper extremity of the link 292 may be seen in Fig. 15 a curved terminal 300 which overhangs the rod 296. This serves as a deflector or guard to prevent the legs of high boots, as those of the cowboy-type, from contacting with the rod and with the pin 294.

To supply screws for insertion by the mechanism B, I utilize the feeding mechanism C and the transfer mechanism D. These are illustrated in detail in Figs. 20 to 27 and 33 to 37 and are shown in their assembled relation in Fig. 1. The feeder (Figs. 35, 36 and 37), which is mounted upon the top of the frame 10, is adapted to deliver screws s, one by one, from a mass and may be generally as appears in Letters Patent of the United States No. 1,948,499, Bertrand, February 27, 1934. There is a stationary hopper 306 having a rotatable conical bottom 308 spaced from the bottom flange of the hopper by a slot 309, and a clearing brush 310 is rotatable above this slot. The shanks of screws contained in the hopper settle through the slot with the heads retained by the margin of the conical bottom and by the opposite hopper-flange. Rotation of the bottom carries the screws circumferentially above a spring-sleeve 312, which retains them for successive discharge by a plunger 314 reciprocating vertically in a guideway at one side of the hopper. These known elements may be actuated in the following manner. The hopper-bottom 308 is fixed upon an extension of the shaft 164. From this shaft, the brush 310 is rotated by belt-gearing 316. To reciprocate the plunger 314, it is linked at 318 to a lever 320 fulcrumed upon a horizontal rod 322 projecting from a bracket 323 rising from the hopper. It is held normally elevated against an adjusting screw 329, threaded through an arm 330 secured to the end of the rod 322, by an expansion-spring 324 surrounding it. A boss on the rear side of the lever 320 is engaged by a screw 325 threaded through an over-hanging boss upon a lever 326, also fulcrumed upon the rod 322. Encircling a hub of the lever 326 is a torsion-spring 327. One end of the spring bears upon an arm of the lever, while the other may engage any one of a circular series of projections 328 from the bracket 323. By varying this engagement at 328, the force of the spring may be altered as to its effect in depressing the levers 326 and 320 and the plunger 314. The lever 326 is turned anticlockwise to tension the spring 327 by a vertical rod 331, through a slot 333 in the upper end of which passes a projection 332 from said lever. At the lower end, the rod is connected to a lever 334 fulcrumed upon the spindle 155 (Fig. 32). A roll 336 upon the lever 334 lies in a groove in the cam member 286. When the rod is drawn down by the cam, the upper end of the slot 333, by its engagement with the projection 332, rotates the lever 326 to put the spring 327 under tension. Upon elevation of the rod by the cam, the end of the slot leaves the projection, so the force exerted through the screw 325 upon the lever 320 is wholly derived from the spring 327. By thus actuating the plunger 314, injury is prevented if clogging occurs.

When the plunger thus ejects a screw from the sleeve 312, said screw falls upon and travels along a chute 338 and into a delivery-nozzle 340, carried with the lower end of the chute upon a bracket 342 (Figs. 20 to 24). This bracket is secured to the frame by slot-and-screw connections 344, so the chute-terminal and the nozzle may be adjusted together in a generally horizontal direction. Pivoted at 346 upon the bottom of the nozzle is a double gate 348, 348 (Figs. 25 and 26), the opposite sections of which are positioned by a stud 350 depending from the nozzle and toward which they are drawn by a connecting tension-spring 352. Divided between the halves of the gate is a delivery-opening 354 registering with the passage through the delivery-nozzle. The opening is normally of such diameter that it will pass the shank of a screw s, while the head will be retained upon downwardly converging conical walls 355, 355 about the opening. The delivery of a screw supported by the gate as appears in Fig. 25, may be effected by a plunger in the form of an elongated rod 356. At its lower extremity, the rod is guided in the nozzle in alinement with the delivery-opening and at its opposite end is pivoted at 358 to the lever 326 (Figs. 35 and 36). The length of the delivery-plunger 356 and the adjustment of the screw 325 for the discharge-plunger 314 are such that when the rod 331 counteracts the effect of the spring 327, the plunger 314 is raised, so the sleeve 312 is free to receive a screw from the hopper-slot 309, at the same time the passage through the delivery-nozzle 340 is opened by the plunger 356 (Figs. 22 and 36). Normally, however, the plungers are lowered by the spring, and there is a screw fed during the preceding cycle resting against the plunger 356 in the nozzle (Fig. 23). Downward movement of the link 331 actuates the lever 326 to raise both plungers, allowing a screw to enter the sleeve 312 from the feeder-slot and the screw in the nozzle to be released to fall upon the gate 348. Reverse movement of the link permits the lever 326 under the influence of the spring 327 to first lower the plunger 356 to close the passage in the delivery-nozzle 340. Thereafter, because of the space between the screw 325 in the lever 326 and the lug upon the lever 320, the plunger 314 is lowered to discharge the screw from the sleeve 312. This travels down the chute into the nozzle, to be held against the side of the plunger 356. The descent of the latter plunger continuing, it contacts with the head of the screw which it has just released upon the gate 348 and forces this through the yielding arms thereof (Figs. 23 and 26).

The screw delivered as just described is received by the transfer mechanism D (Figs. 20, 21, 24, 27, 33 and 34). Trunnioned at 360 upon the frame is a guide member 362, in which a carrier-rod 364 is mounted to reciprocate. To the forward extremity of the rod, opposite spring-fingers 366, 366 are attached. The outer ends of these fingers are curved away from each other, forming a space 368 (Fig. 27) into which the shank of a screw may enter and be grasped, the head being spaced from the fingers. The fingers are moved by the carrier-rod from normal intermediate position (Fig. 1) rearwardly to one in which the space between them is alined with the gate-opening 354 (Fig. 20), and then forwardly to present a contained screw to the holder-arms 208, 208 of the inserting mechanism B (Fig. 21). Since the screw is delivered to the fingers point down and must be inserted in the work point up, the rod 364 is turned about its axis through 180° during its travel. This is accomplished by a helical groove 370 formed in the rod and having extending into it a controlling roll 372 turning upon the guide-sleeve 362. To insure correct alinement of the transferred screw with the arms 208, the actuating connections for the rod 364 are made through a split sleeve 374, which may be clamped by a screw 376 in different positions along the rod to attain the desired screw-presenting relation (Figs. 27 and 33). The sleeve has a bearing in a swinging arm 390 pivoted at 392 upon the frame (Figs. 20 and 21). It is directly clamped by the screw 376 upon a sleeve 394 located between a shoulder 396 and a spacing-sleeve 398 backed by a collar 400 secured to the rod. In the sleeve 394 turns the reduced end 401 of the rod. The position of the nozzle 340 may be made to agree with that of the transfer-rod by the adjustment furnished by the connections at 344 between the bracket 342 and the frame. Articulated at 402 to the arm 399 is one extremity of opposite connecting links 404, 404 pivoted together at 406 (Fig. 34). Opposed surfaces 408, 408 are normally held yieldably together by a torsion-spring 410. To the link opposite the connection 402, a lever 412 is joined (Fig. 32), this lever being fulcrumed upon the spindle 155 and oscillated by a roll 414, occupying with the roll 336 the groove in the cam-disk 286. After the fingers 366 have received a screw as a result of the depression of the delivery-plunger 356, the transfer-rod 364 travels forward under the influence of the connections to the lever 412 and is also swung downwardly, its guide-sleeve turning upon the trunnion 360. The fingers are simultaneously rotated through a half-turn by the groove 370 in the transfer-rod. This causes the screw-holding ends of the fingers 366 to meet and enter between the surfaces 248 of the holder-arms 208 at the inserting mechanism B (Figs. 16 and 27). The screw-head is received by the space 246 between the arms. The transfer-rod now rests, while the descending holder-arms wipe over the outside of the fingers and engage the screw-head, withdrawing it from said fingers. The transfer-rod thereupon returns to its initial position. If an obstruction is encountered by the transfer device in its forward travel, the spring 410 yields, the surfaces 408 of the links 404 separate, and damage is prevented. If it is thought necessary, failure of the holder-arms 208 to remove the screw from the transfer-fingers 366 may be guarded against positively. This will prevent the forcing of a screw by the delivery-plunger 356 against a screw which has been retained between the transfer-fingers. Attached to the guide member 362 at 414 is a leaf-spring 415 (Figs. 24 and 27). This extends outwardly and at its forward extremity has upper and lower arms 416 projecting over slots 417 in the guide member, through which slots the opposite ends of the screw in the carrier-arms extend before inversion begins. At their inner extremities, the arms have forwardly inclined edges 418. These edges are so situated, that when a screw is borne out by the transfer device, its contact with the inclines forces the arms 416 out of the path, the spring 415 yielding. If, however, in the return of the transfer device, a screw is still held by it, its extremities will engage the straight outer edges of the arms and be forced from between the transfer-fingers, falling away from the nozzle 340.

The treadle mechanism E governs the operation of the machine (see Figs. 1, 3, 4, 31 and 32). The first effect of this mechanism is to draw down the pressure-head of the mechanism P (Fig. 28) into engagement with a heel H which has been placed upon the heel-seat of a jacked shoe S. At 420 upon the lower portion of the frame is pivoted a treadle 422. A link 424 unites the treadle to one arm of a U-shaped intermediate lever 426 (Figs. 3 and 4) fulcrumed upon a spindle 428 extending horizontally through the frame 10. To the second arm of this lever 426, another intermediate lever 430 is joined, this resting loosely upon a projection 432 of the lever 426. To the lever 430, between its fulcrum and the projection, a link 434 is united, this leading to the pressure mechanism. A spring 435 extending between the frame and the rear extremity of the lever 430 resists the depression of the treadle. There has already been described the slide 50 which carries the pressure-head P, and which is normally elevated by the spring 56. Projecting from one side of the slide is an arm 436, and connected to this by a short link 438 is a lever 440 which, at its rear extremity, is pivoted to a fulcrum-slide 442 movable vertically in the main carrier-slide 50. The slide 442 is alined vertically with the spindle 155, and resting upon this spindle within a bore in said slide is a spring 444. Guided in projections 446, 446 from the slide 442 for vertical movement is a rod 448, drawn up by a spring 450 into a passage 452 in the slide 50 to force a roll or ball 454 into engagement with an inclined surface 456 upon the slide 442. The effect of this is to lock the slides 50 and 442 together. Upon depression of the treadle 422, the link 434 swings the lever 440 about its connection to the slide 442. The resistance of the spring 444 to compression is sufficient to maintain the slide 442 against movement as a fulcrum for the lever. The ratio of the arms of the lever 440 at opposite sides of the connection to the link 434 is such as to draw down the slide 50 and the pressure-head at a relatively rapid rate. The abutments 42 and 44 are thus brought promptly into contact with the heel. When this occurs, and the descent of the slide 50 is thereby arrested, the spring 444 yields upon continued depression of the treadle 422. As a result, the slide 442 is drawn down, forcing the inclined surface 456 against the roll 454 to lock the slides 50 and 442 together. When this occurs, the pull of the link 434 is applied directly to the main slide, and there is impressed through the head P upon the heel H a greater clamping pressure for the drilling and screw-inserting operations than could be obtained by the element 440 acting as a lever. Upon completion of the operations upon the work and release of the treadle, the elevation of the slide 50 by the spring 56 carries the roll 454 against a vertical rod 460 secured to the upper frame-projection 54 and extending into the passage 452. This stops the rising roll, unlocking the slide, which is returned by the spring 450 to its initial position, freeing the jacked work.

Upon engagement of the pressure-head with the work, the downward movement of the link 434 is substantially stopped, so its connection to the lever 430 becomes a fulcrum about which said lever may be swung by continued depression of the treadle. The rear of the lever 430 is thereby raised from the lever-projection 432. The pressure upon the work, which has been of a degree permitted by the relatively slow elongation of the spring 435 as the lever 430 turned upon the projection 432, is now increased as the spring lengthens more rapidly upon elevation of the lever from the projection and the fulcrum-point is transferred to the pivot of the link 434. This insures a firm clamping of the heel upon the heel-seat. During this action, a pawl 460 pivoted upon the treadle 422 and provided with an outwardly extending treadle-arm 462 has reached a series of teeth 464 carried upon the outer end of a connecting arm 466 turning about the treadle-pivot 420. Against the teeth, the pawl is drawn by a spring 468, the movement of the arm 462 being limited by a stop 469 upon the treadle 422. The operator then releases the treadle, which is raised slightly by the spring 435, correspondingly lifting, through the pawl 460, a link 470 which joins the treadle-arm 466 to a bell-crank-lever 472 fulcrumed upon the spindle 428, about which it is swung anticlockwise (Fig. 3). This movement is to an extent allowed by the contact of the outer arm of the bell-crank-lever at 474 with a portion of the frame. The retraction of the treadle 422 and the pressure-rod 434 is thereby stopped. The opposite arm of the bell-crank-lever is simultaneously removed from limiting contact with the frame at 475. Pivoted at 476 to this lever is a clutch-controlling arm 478 having fixed upon its rear extremity a contact-plate 480 (Fig. 5). A spring 482 unites a depending portion of the arm to the lower end of the clutch-controlling link 205, which communicates the effect of the cam-disk 158 to the clutch c. In the movement of the lever 472 just referred to, the arm 478 is shifted to the left. Beside the arm 478 lies a latching arm 484 pivoted upon the spindle 428. This is provided with a contact-plate 486 normally extending below a contact-plate 487 terminating a clutch-controlling lever 489. To give the correct relation between the plate 487 and those upon the controlling arm 478 and the latch-arm 484, it may be adjusted horizontally and secured in place by screws 488, 488. A spring 490 joins the clutch-lever 489 to a depending portion of the arm 484. A lateral extension 492 from the link 205 lies just above both arms.

No particular form of the clutch c is essential to this invention. A convenient arrangement is illustrated in Fig. 3. Turning about the driving shaft 110 of the machine is a pulley 494 furnishing a part of the belt-gearing 112. Rotatable with this pulley is a friction-ring 496 lying between a plate 498, fast upon the shaft 110, and an annular plate 500, supported by and spaced from a casing 502 splined upon the hub of the plate 498. Expansion-springs 504 interposed between the casing and the plate 498 urge the plate 500 toward the ring 496. The clutch-lever 489 has pivoted upon it a yoke 506 arranged to shift the casing 502 along the hub. The yoke, when swung clockwise by its lever 489 (Fig. 3) through the action of the controlling arm 478, permits the springs 504 to act on the casing to urge the plate 500 against the ring 496 and this against the plate 498 and thus cause the rotation of the shaft 110. At the same time, the yoke removes a brake 508 from the casing 500. Release of the clutch-lever 489 results in the moving away of the plate 500 from the ring and the application of the brake to stop the shaft 110. Upon the previously described movement toward the left of the controlling arm 478 under the influence of the bell-crank-lever 472, its plate 480 engages the plate 487 secured to the end of the clutch-lever 489 and by the clockwise movement of said lever causes the driving of the shaft 110, as just indicated. Normally, or at the beginning of a regular cycle of the machine, the cam-shaft 160 and its immediately associated elements occupy the positions illustrated in Figs. 31 and 32. The lever 196 will be held against the force of the spring 200 by the contact of a projection 512 formed upon it with a cam-projection 514 upon the disk 158. Consequently, the arm 204 upon the spindle 198 of the lever 196 will maintain the link 205 raised. The link-extension 492 will be located as best appears in Fig. 5. That is, it is at the rear of a shoulder 516 upon the cam-controlling arm 478 and above a shoulder 518 upon the latch-arm 484. In this relation, it will have been carried forward when the advance of the controlling arm caused the engagement of the clutch, the link turning upon its pivotal connection to the arm 204 and being guided at 520 upon the frame (Fig. 5). The extension 492 is thereby located at the rear of the shoulder 518, and this permits the latch-arm 484 to be lifted by the spring 490 into the plane of the plate 487. This retains the lever 489 against anticlockwise movement and holds the clutch c engaged, regardless of the position of the treadle 422. When the shaft 160 rotates, following the engagement of the clutch, the projection 514 leaves the projection 512, so the spring 200 may act to turn the lever 196 anticlockwise (Fig. 31), raising the link 205. This action is further made positive by engagement of a peripheral projection 522 upon the cam-disk 158 with a lever-projection 524. In consequence of this, the link-extension 492 is freed from the shoulder 516 and carried over it by the spring 482, resting above the shoulder when the cam-projection 522 passes the lever-projection 524. The rotation of the cam-shaft 160 continues through 360°, during which a complete cycle of the machine is performed. When the cam-projection 514 again reaches the lever-projection 512, it reestablishes the relation of Fig. 31, and the link 205 is lowered. This, by the depression of the arm 484, frees the clutch-lever 489 from the latch-plate 486 and enables the spring 490 to open the clutch c and apply the brake 508 to stop the shaft 110. The operating cycle is thus terminated. Lowering of the release-treadle 462 by the operator frees the arm 466 from the pawl 460, and the bell-crank-lever 472 and the clutch-controlling arm 478 are restored by gravity to the normal positions of Fig. 3, when the operator removes his foot from the treadle 422. This draws the shoulder 516 of the clutch-controlling arm 478 from beneath the link-extension 492. The elements are now as represented in Fig. 5.

Reference has been made, in connection with the deflector 300, to the use of the apparatus for operating upon legboots. With such work, the leg of the boot may be of sufficient length to come into the path of the transfer mechanism D. This difficulty I overcome by furnishing means whereby the operating cycle may be divided into two portions, initiated by independent actuations of the treadle mechanism E. The delivery of a screw by the transfer mechanism to the holder-arms 208 of the inserting mechanism B occurs shortly before the close of the cycle. I therefore provide upon the periphery of the cam-disk 158, in addition to the normal stopping projection 514, an intermediate stopping projection 530 (Fig. 31). This projection 530 lies in a vertical plane with a variable contact-projection 532, which may be turned upon the lever 196 by a finger-piece 534 about a pivot-pin 536. This movement is from an inactive position shown in full lines in Fig. 31 to the active relation indicated by dotted lines, where the projection 532 is supported by a lug 538 upon the lever. This projection, when forward, is reached by the cam-projection 530 before the cam-projection 514 and acts upon the clutch-controlling mechanism in precisely the same manner. It merely stops the machine just before the transfer device reaches the inserting mechanism. The attaching operations occurring in the cycle have been completed. Therefore with the auxiliary projection in use, the operator may remove the boot with the attached heel from the jack J and upon again depressing the treadle 422, the screw-delivering action is performed, and the machine is stopped as before in its normal relation by the projection 514.

To trace briefly the machine-cycle, the initial positions of the elements are as appears in Fig. 1. The casing 62 is back, with the drill mechanism A in operating relation. The drill 100 is near its lowest point, with the countersink 90 and the counterdrill 92 lowered upon the drill ready for their successive action. The inserting mechanism B is at its lowest point, with its arms 208 holding a screw s supplied to them during the the close of the preceding cycle. The transfer device D has receded a short distance from the mechanism B, to which it has just supplied the screw. The delivery-plunger 356 of the feeding mechanism C is down in the nozzle 340 holding back a screw s discharged from the retaining sleeve 312 of the hopper 306 by the plunger 314. The pressure-head P is raised. The operator places upon the jack J a shoe S and upon the heel-seat a heel H, with or without an interposed adhesive. Depression of the treadle 422 at the mechanism E through the link 434 lowers the pressure-head, first through the pivotal movement of the lever 440 quickly until the tread- and rear abutments are seated upon the heel and then more slowly and with greater force when the lever becomes locked to the head-slide 50 by the slide 442 and the roll 454 (Fig. 28). The treadle-pawl 468 (Fig. 3) comes into position for engagement with the teeth upon the treadle-arm 466, so, as the operator releases the treadle, the arms 478 and 484 cause the engaging and latching through an operating cycle of the clutch c controlled by its lever 489. The cam-shaft 160 thereupon makes one rotation and is stopped, for the work usually performed, by the cam-projection 514 (Fig. 31), which, through the lever 196 and the link 205, unlatches the clutch to terminate the cycle. As the rotation of the cam-shaft begins, the transfer device at once moves promptly back to its receiving position beneath the nozzle 340. During the operations upon the work at the jack, the plunger 356 is raised (Fig. 22) to allow the screw which it is holding to drop upon the gate members 348. Then its movement is reversed, and the screw is forced down through the gate between the transfer-fingers 366 (Fig. 23). At the same time, the discharge-plunger 314 is ejecting the succeeding screw from the retainer 312 (Fig. 36). Having received the screw point down, the transfer device travels forward, the groove 370 in the rod 366 causing said screw to be turned point up in transit.

Considering now the drilling mechanism A and the inserting mechanism B, the rise of the former begins immediately upon the rotation of the cam-shaft, while the latter starts at substantially the same time. Under the influence of the lever 154, the carrier-cylinder 76 for the mechanism A is lifted, and the drill-shaft 98 is rotated from the shaft 110. The shaft 98 turns the countersink 90 and the counterdrill 92, and through engagement of the counterdrill with the flutes of the drill 100, said drill is driven. The tools rise through the opening 33 in the jack-top 32 and successively bore through the heel-seat into the heel and counterbore and countersink the heel-seat to a depth determined by the contact of the gage-sleeve 82 with the insole (Fig. 13). The mechanism A having completed its operations, it is quickly withdrawn to the position of Figs. 1 and 14. If the rise of the drill is prematurely stopped by an obstruction in the heel-seat, the rod 186 shifts the lever 196 (Fig. 31) to disconnect the clutch c and stop the machine. While the drilling operations have been going on, the inserting mechanism B with its arms 208 bearing the previously delivered screw s, has been ascending, acted upon by the lever 280, as will be seen by a comparison of Figs. 1 and 13. Its shaft 216 is being driven through the yieldable connections at 264 (Fig. 6) to the gearing rotating the drill-shaft 98. When the mechanism A is free from the work, the casing 62 is shifted horizontally by the cam-slot 288 of the lever 280, until the mechanism B is positioned at the operating axis. Then the rising inserting mechanism reaches a point at which the screw enters the hole which has been formed in the work by the mechanism A. Its holder-arms 208 yield, and the screw-driver 209 continues up into contact with the screw-head, the slot of which it finds and enters. Thereafter, the shaft 216 is given a sufficient number of turns to insure the complete insertion of the screw with its head in the countersunk depression (Fig. 14), the driver at the end of this operation yielding both as to rotation and elevation. The inserting mechanism B is now lowered and as it approaches its normal position, it meets the transfer mechanism D (Fig. 21), which is shifted quickly forward with the contained screw which it has inverted during the travel. The transfer-fingers 366 force their way between the holder-arms, separating these and placing the screw-head in the space 246 between the arms. These arms, as they descend, draw the screw from between the transfer-fingers, which retreat to their initial position, ready to move back for the reception of the next screw, and the inserting mechanism returns to normal. During the rise of the inserting mechanism, its projections 170 engage the bottom of the sleeve 82 (Fig. 19), elevating this and the countersink- and counterdrill-sleeve 96 to force the counterdrill-portions 92 through the flutes of the drill 100 to remove waste therefrom.

The cycle has thus been completed. The clutch c is disconnected by the action of the cam-projection 514, and the machine is made ready for the succeeding operation by the restoration of the treadle and controlling mechanism E and the pressure mechanism P to normal through the depression of the latching arm 462 by the operator, who may finally remove the shoe S with its attached heel H from the jack J. If, at any time, there is to be operated upon a shoe or a boot having a portion interfering with the delivery of screws by the transfer mechanism, the cycle is divided by turning the pivoted projection 532 (Fig. 31) into active position. The cam-projection 530 then becomes effective to stop the transfer mechanism before it reaches the jack. This permits the operator to remove the completed work and then cause the delivery of the screw by a second depression of the treadle, completing the transfer. If, at any time during the operating cycle, it is desired to make an emergency stop of the machine, the lever 196 may be swung rearwardly through engagement by the operator of a hand-hold 550 thereon. This has the same effect as though either of the stopping projections 514 or 530 had acted. In initiating the action of the apparatus, the operator may wish to be able to alter the positions of the shoe and heel after pressure has been applied by the head P but before power-operation has started. This is rendered possible by depressing the treadle 422 and its arm 462 simultaneously. Since the pawl 460 cannot then engage the teeth 464, the mechanism controlled by the link 470 is unaffected and the clutch c is not engaged. When the work is arranged to his liking, the operator may release the arm while still holding down the treadle. With the pawl thus allowed to engage the teeth, the treadle is also released and power is applied to the operating mechanisms as previously described.

Having described my invention, what I claim as new and desire to secure by Letters Patent of the United States is:

1. In a fastening-inserting machine, a work-support, means for forming a hole in the supported work, means movable along the operating axis of the forming means for grasping a fastening, presenting it to the formed hole and inserting it in said hole, and means for moving the support and the forming means and inserting means relatively to cause said forming and inserting means to act successively along the same operating axis.

2. In a fastening-inserting machine, a work-support, pressure means for clamping the work upon the support, hole-forming means and fastening-inserting means co-operating with the support for successive action upon the work, means whereby the operator may cause the actuation of the pressure means, and means made effective by such actuation for initiating an automatic operating cycle of the forming and inserting means.

3. In a fastening-inserting machine, a work-support, pressure means for clamping the work upon the support, hole-forming means and fastening-inserting means co-operating with the support for successive action upon the work, means whereby the operator may cause the actuation of the pressure means to first apply to the work preliminary pressure and thereafter final pressure, and means made effective upon the application of final pressure for initiating an automatic operating cycle of the forming and inserting means.

4. In a fastening-inserting machine, a work-support, means for forming a hole in the supported work, means for inserting a fastening in the hole thus formed, means for continuously rotating the forming and inserting means during an operating cycle, means for reciprocating both said forming and inserting means continuously during such cycle, and means for moving the support and the forming means and inserting means relatively to cause said forming and inserting means to act successively along the same operating axis.

5. In a fastening-inserting machine, a work-support, means for forming a hole in the supported work, means for inserting a fastening in the hole thus formed, means for rotating the forming means, means releasable by resistance encountered for communicating the rotation of the forming means to the inserting means, and means for reciprocating the forming and inserting means.

6. In a fastening-inserting machine, a work-support, means for forming a hole in the supported work, means for inserting a fastening in the hole thus formed, actuating means for the forming and inserting means, and means controlled by the forming means for rendering the actuating means ineffective.

7. In a fastening-inserting machine, a work-support, means for forming a hole in the supported work, means for inserting a fastening in the hole thus formed, actuating means for the forming and inserting means, means controlled by the forming means for rendering the actuating means ineffective, and means for limiting the action of the controlling means to a portion only of the operating cycle.

8. In a fastening-inserting machine, a work-support, means for forming a hole in the supported work, means for inserting a fastening in the hole thus formed, a feeder in which fastenings are contained in a mass, and means for delivering the fastenings one by one from the feeder and transferring them to the inserting means for application to the holes produced by the forming means.

9. In a fastening-inserting machine, a work-support, means for forming a hole in the supported work, means for grasping and inserting a fastening in the hole thus formed, means for moving the forming and inserting means alternately into and out of active position, and means for delivering a fastening into the grasp of the inserting means during its travel following the production of the hole by the forming means.

10. In a fastening-inserting machine, a work-support, means for forming a hole in the supported work, means for inserting a fastening in the hole thus formed, means for moving the forming and inserting means alternately into and out of active position, and means for delivering a fastening to the inserting means during its recession from the work.

11. In a fastening-inserting machine, a work-support, means for forming a hole in the supported work, means for inserting a fastening in serting mechanism, a screw-feeder provided with a retainer to which screws are supplied one by one, a raceway leading from the retainer, a nozzle terminating the raceway, a screw-transferring device movable between the nozzle and the inserting mechanism, delivery-plungers respectively movable in the retainer and in the nozzle, an actuating lever connected to each plunger, and a spring for moving one lever, said lever acting upon the companion lever to actuate it.

72. In a screw-inserting machine, screw-inserting mechanism, a screw-feeder provided with a retainer to which screws are supplied one by one, a raceway leading from the retainer, a nozzle terminating the raceway, a screw-transferring device movable between the nozzle and the inserting mechanism, delivery-plungers respectively movable in the retainer and in the nozzle, and a gate controlling delivery from the nozzle and arranged to be displaced by action of the nozzle-plunger.

73. In a screw-inserting machine, screw-inserting mechanism, a screw-feeder provided with a retainer to which screws are supplied one by one, a raceway leading from the retainer, a nozzle terminating the raceway, a screw-transferring device movable between the nozzle and the inserting mechanism, delivery-plungers respectively movable in the retainer and in the nozzle, and a gate consisting of oppositely yieldable sections having between them an opening through which the shank of a screw may pass while the head is retained upon the sections, said gate controlling the delivery from the nozzle.

74. In a screw-inserting machine, screw-inserting mechanism having reciprocatory screw-grasping means, screw-feeding mechanism, and a transferring device having screw-grasping means receiving a screw from the feeder and movable into the path of the grasping means of the inserting mechanism.

75. In a screw-inserting machine, screw-inserting mechanism having reciprocatory screw-grasping means, screw-feeding mechanism, a reciprocatory rod having at one extremity opposite spring-fingers for receiving screws from the feeding mechanism, and means for reciprocating the rod to carry the fingers between the feeding mechanism and the inserting mechanism.

76. In a screw-inserting machine, reciprocatory screw-inserting mechanism provided with opposite jaws having at one side diverging surfaces and an adjacent space, screw-feeding mechanism, a transferring device having spring-fingers arranged to receive the shank of a screw between them with the head spaced from the fingers, and means for reciprocating the transferring device to force the fingers against the diverging surfaces of the jaws and the screw-head into the space between the jaws.

77. In a screw-inserting machine, screw-inserting mechanism having reciprocatory screw-grasping means, screw-feeding mechanism, and a transferring device having screw-grasping means receiving a screw from the feeder and movable into the path of the grasping means of the inserting mechanism, said transferring device being turned during its travel to invert the screw.

78. In a screw-inserting machine, screw-inserting mechanism having reciprocatory screw-grasping means, screw-feeding mechanism, a reciprocatory rod having at one extremity grasping means receiving screws from the feeding mechanism, the rod being provided with a helical groove, a guide for the rod having a projection extending into the groove, and means for moving the rod to carry its grasping means from the feeder to the inserting means.

79. In a screw-inserting machine, reciprocatory screw-inserting mechanism, screw-feeding mechanism, a guide member, a rod movable in the guide member and provided with screw-grasping means, and connections to the end of the rod opposite the screw-grasping means to reciprocate the rod and carry said grasping means between the feeder and the inserting means.

80. In a screw-inserting machine, reciprocatory screw-inserting mechanism, screw-feeding mechanism, a pivoted guide member, a rod movable in the guide member and provided with screw-grasping means, a swinging arm, and connections upon the arm arranged to be secured at different points along the rod.

81. In a screw-inserting machine, reciprocatory screw-inserting mechanism, screw-feeding mechanism, a guide member, a rod movable in the guide member and provided with screw-grasping means, a swinging arm, a clamping sleeve turning in the arm, and a sleeve surrounding the rod and which is engaged by the clamping sleeve.

82. In a screw-inserting machine, reciprocatory screw-inserting mechanism, screw-feeding mechanism, a guide member, a rod movable in the guide member and provided with screw-grasping means, and connections to the rod and including a wieldable portion to reciprocate the rod and carry said grasping means between the feeder and the inserting means.

83. In a screw-inserting machine, reciprocatory screw-inserting mechanism, screw-feeding mechanism, a guide member, a transferring device movable through the guide member, a swinging arm joined to said device, an actuating member for the transferring device, and a pair of pivoted links connecting the actuating member and the transferring device and having surfaces yieldably urged together.

84. In a screw-inserting machine, screw-inserting mechanism, screw-feeding means, transferring mechanism provided with screw-holding means movable forward from the feeding means to the inserting mechanism to deliver a received screw to said inserting mechanism, and means for removing the screw from the holding means upon return movement thereof.

85. In a screw-inserting machine, screw-inserting mechanism, screw-feeding means, transferring mechanism provided with screw-holding means movable forward from the feeding means to the inserting mechanism to deliver a received screw to said inserting mechanism, and a member movable by contact of the screw out of its path during the forward movement but engaging said screw upon return movement to remove it from the holding means.

86. In a screw-inserting machine, screw-inserting mechanism, screw-feeding means, transferring mechanism provided with screw-holding means movable forward from the feeding means to the inserting mechanism to deliver a received screw to said inserting mechanism, and a spring member provided with an inclined surface lying in the path of the screw during forward movement thereof and a substantially straight surface engaging the screw during return movement.

87. In a screw-inserting machine, screw-inserting mechanism, screw-feeding means, transferring mechanism provided with opposite spring-fingers between which a screw is supplied by the feeding means with the ends extending oppositely therefrom, said screw being normally delivered to the inserting mechanism, and a spring having arms projecting at opposite sides of the fingers for contact with the screw and arranged to remove said screw if retained by the fingers during return movement.

88. In a fastening-inserting machine, a work-support, fastening-inserting mechanism co-operating therewith, a pressure-head acting upon the supported work to hold it to receive the action of the inserting mechanism, a slide carrying the pressure-head, a lever connected to the slide, means arranged to alter the fulcrum of the lever, and actuating connections for the slide to the lever.

89. In a fastening-inserting machine, a work-support, fastening-inserting mechanism co-operating therewith, a pressure-head acting upon the supported work to hold it to receive the action of the inserting mechanism, a slide carrying the pressure-head, a lever connected to the slide, means for locking the lever against movement upon the slide, and actuating connections for the slide to the lever.

90. In a heel-attaching machine, a shoe-support, fastening-inserting mechanism co-operating therewith, a pressure-head acting upon a heel on a supported shoe to hold it to receive the action of the inserting mechanism, a slide carrying the pressure-head, a lever pivotally connected to the slide, a yieldable member upon which the lever is fulcrumed, locking means for the fulcrum member, and actuating connections for the slide to the lever.

91. In a heel-attaching machine, a shoe-support, fastening-inserting mechanism co-operating therewith, a pressure-head acting upon a heel on a supported shoe to hold it to receive the action of the inserting mechanism, a slide carrying the pressure-head, a lever pivotally connected to the slide, a yieldable member upon which the lever is fulcrumed, locking means for the fulcrum member made effective upon yield of said fulcrum member, and actuating connections for the slide to the lever.

92. In a heel-attaching machine, a shoe-support, fastening-inserting mechanism co-operating therewith, a pressure-head acting upon a heel on a supported shoe to hold it to receive the action of the inserting mechanism, a slide carrying the pressure-head, a lever pivotally connected to the carrier-slide, a yieldable slide upon which the lever is fulcrumed, means for locking the fulcrum-slide to the carrier-slide, and actuating connections for the slide to the lever.

93. In a heel-attaching machine, a shoe-support, fastening-inserting mechanism co-operating therewith, a pressure-head acting upon a heel on a supported shoe to hold it to receive the action of the inserting mechanism, a slide carrying the pressure-head, a lever pivotally connected to the carrier-slide, a slide movable upon the carrier-slide and upon which the lever is fulcrumed, a spring supporting the fulcrum-slide, means for locking the fulcrum-slide to the carrier-slide upon yield of the spring, and a treadle connected to the lever.

94. In a heel-attaching machine, a shoe-support, fastening-inserting mechanism co-operating therewith, a pressure-head acting upon a heel on a supported shoe to hold it to receive the action of the inserting mechanism, a slide carrying the pressure-head, a lever pivotally connected to the carrier-slide, a slide movable upon the carrier-slide and upon which the lever is fulcrumed, the slides carrying a co-operating inclined surface and roll by which they may be locked together, a spring supporting the fulcrum-slide, and actuating means for the lever.

95. In a heel-attaching machine, a shoe-support, fastening-inserting mechanism co-operating therewith, a pressure-head acting upon a heel on a supported shoe to hold it to receive the action of the inserting mechanism, a slide carrying the pressure-head, a lever pivotally connected to the carrier-slide, a slide movable upon the carrier-slide and upon which the lever is fulcrumed, a spring supporting the fulcrum-slide, means for locking the fulcrum-slide to the carrier-slide upon yield of the spring, a treadle connected to the lever to depress the carrier-slide, and means for releasing the locking means upon retraction of the treadle.

96. In a heel-attaching machine, a frame, a shoe-support and fastening-inserting mechanism mounted upon the frame, a slide movable upon the frame, an arm pivoted upon the slide, means for releasably securing the arm to the slide to be turned thereon by the operator out of active position when freed, and a pressure member carried by the arm for engagement with a heel upon a supported shoe.

97. In a heel-attaching machine, a frame, a jack mounted thereon, a tool for operating upon a jacked shoe, a slide movable upon the frame, a pressure-head pivoted upon the slide and extending above the jack, movement of the head about its pivot out of active position giving access to the tool, and means for securing the head to the slide against its pivotal movement and in operating relation.

98. In a fastening-inserting machine, a work-support, inserting mechanism for operating upon supported work, pressure means movable to hold the work upon the support to receive the action of the inserting mechanism, a clutch through which the inserting mechanism is driven, a controlling member for the clutch, a treadle depressible by the operator to actuate the pressure means, and connections between the treadle and the controlling member to cause the action of said controlling member upon retraction of the treadle.

99. In a fastening-inserting machine, a work-support, inserting mechanism for operating upon supported work, pressure means movable to hold the work upon the support to receive the action of the inserting mechanism, a clutch through which the inserting mechanism is driven, a controlling member for the clutch, a treadle depressible by the operator to actuate the pressure means, a treadle-arm pivoted upon the treadle, a connecting arm pivoted upon the treadle, toothed connections between the two arms, and means actuated by the connecting arm for controlling the clutch-lever.

100. In a fastening-inserting machine, a work-support, inserting mechanism for operating upon supported work, pressure means movable to hold the work upon the support to receive the action of the inserting mechanism, a clutch through which the inserting mechanism is driven, a controlling member for the clutch, a treadle depressible by the operator to actuate the pressure means, an intermediate lever to which the treadle is joined, a second intermediate lever fulcrumed upon the first and limited thereby in its movethe carrier, a screw-driver movable along the shaft and a spring interposed between the screw-driver and the shaft.

44. In a heel-attaching machine, a shoe-support, and a screw-inserting assembly co-operating therewith and comprising a rotatable and reciprocable tubular shaft, a spring within the shaft, a screw-carrier surrounding the shaft and resting upon the spring, screw-grasping means mounted upon the carrier, a second spring within the shaft and a screw-driver having a portion guided within the shaft and supported upon the second spring.

45. In a heel-attaching machine, a shoe-support, and a screw-inserting assembly co-operating therewith and comprising a rotatable and reciprocable tubular shaft in which is a longitudinal slot, a spring within the shaft, a pin extending through the slot and resting upon the spring, a screw-carrier surrounding the shaft and supported by the pin, screw-grasping means mounted upon the carrier, a second spring within the shaft and a screw-driver having a portion extending into the shaft and supported upon the second spring.

46. In a heel-attaching machine, a shoe-support, and a screw-inserting assembly co-operating therewith and comprising a rotatable and reciprocable tubular shaft in which is a longitudinal slot, a spring within the shaft, a pin extending through the slot and resting upon the spring, a screw-carrier surrounding the shaft and supported by the pin, screw-grasping means mounted upon the carrier, a screw-driver having a portion within the shaft, pins extending across the shaft and across the screw-driver portion and a spring interposed between the pins.

47. In a heel-attaching machine, a shoe-support, and a screw-inserting assembly co-operating therewith and comprising a rotatable and reciprocable shaft, a screw-carrier movable along the shaft, opposite screw-grasping jaws pivoted upon the carrier and each provided with a recess, a U-spring having its opposite ends seated in the recesses and a screw-driver movable along the shaft and operating between the jaws.

48. In a heel-attaching machine, a shoe-support, and a screw-inserting assembly co-operating therewith and comprising a rotatable and reciprocable tubular shaft, a screw-carrier movable along the shaft, screw-grasping jaws pivoted upon the carrier, a sleeve movable within the shaft, a connector threaded into the sleeve and a screw-driver threaded into the connector at the end opposite the sleeve.

49. In a heel-attaching machine, a shoe-support, and a screw-inserting assembly co-operating therewith and comprising a rotatable and reciprocable tubular shaft, a screw-carrier movable along the shaft, screw-grasping jaws pivoted upon the carrier, a sleeve movable within the shaft, a connector threaded into the sleeve and having an enlargement between its ends, a screw-driver threaded into the connector at the end opposite the sleeve, a sleeve surrounding and movable along the screw-driver and arranged to receive a screw-head at its outer extremity and a spring interposed between the connector-enlargement and the head-engaging sleeve.

50. In a heel-attaching machine, a jack, a horizontally movable carrier, a screw-driver-shaft rotatable in the carrier and movable vertically therethrough toward and from the jack, the horizontal movement of the carrier shifting the screw-driver-shaft into and out of operating relation to the jack, an actuating slide reciprocating through the carrier and connected to the shaft, a lever oscillating about a fulcrum fixed with relation to the carrier, and a link joining the lever to the slide.

51. In a fastening-inserting machine, a work-support, a movable carrier co-operating therewith, a drill-shaft and a screw-driver-shaft journaled in the carrier and alternately movable thereby into operating position, a driving shaft, gearing connecting the driving shaft and drill-shaft, gearing connecting the driving shaft and the screw-driver-shaft, and a connection including the last-mentioned gearing and being releasable when sufficient resistance is encountered by the screw-driver-shaft.

52. In a fastening-inserting machine, a work-support, a movable carrier co-operating therewith, a drill-shaft and a screw-driver-shaft journaled in the carrier and alternately movable thereby into operating position, a driving shaft, a countershaft journaled in the carrier, three gears upon the countershaft one of which is arranged to slip upon said shaft, and gears upon the driving shaft, drill-shaft and screw-driver-shaft meshing respectively with the three gears upon the countershaft.

53. In a fastening-inserting machine, a work-support, a movable carrier co-operating therewith, a drill-shaft and a screw-driver-shaft journaled in the carrier and alternately movable thereby into operating position, a driving shaft, a countershaft journaled in the carrier, elongated spiral gears connecting the driving shaft and countershaft, spur-gears connecting the countershaft and the drill-shaft and screw-driver-shaft respectively, and a yieldable connection between the countershaft and its gear for actuating the screw-driver-shaft.

54. In a fastening-inserting machine, a work-support, a movable carrier co-operating therewith, a drill-shaft and a screw-driver-shaft journaled in the carrier and alternately movable thereby into operating position, a driving shaft, a countershaft journaled in the carrier, three gears upon the countershaft, corresponding gears upon the driving shaft, drill-shaft and screw-driver-shaft, the gears for the driving shaft and drill-shaft being fast upon the countershaft while the gear for the screw-driver-shaft may turn thereon, and a spring-plunger carried by the driving-shaft-gear of the countershaft and engaging the screw-driver-shaft-gear on said countershaft.

55. In a fastening-inserting machine, a work-support, a movable carrier co-operating therewith, a drill-shaft and a screw-driver-shaft journaled in the carrier and alternately movable thereby into operating position, a driving shaft, a countershaft journaled in the carrier, three gears upon the countershaft, corresponding gears upon the driving shaft, drill-shaft and screw-driver-shaft, the gears for the driving shaft and drill-shaft being fast upon the countershaft while the gear for the screw-driver-shaft may turn thereon, a spring-plunger carried by the driving-shaft-gear of the countershaft and engaging the screw-driver-shaft-gear on said countershaft, and a member movable to vary the force of the plunger-spring and situated within the drill-shaft-gear upon the countershaft.

56. In a fastening-inserting machine, a work-support, a movable carrier co-operating therewith, a drill-shaft and a screw-driver-shaft journaled in the carrier and alternately movable thereby into operating position, a driving shaft, a countershaft journaled in the carrier, three gears upon the countershaft, corresponding gears upon the driving shaft, drill-shaft and screw-driver-shaft, the gears for the driving shaft and drill-shaft being fast upon the countershaft while the gear for the screw-driver-shaft may turn thereon, a spring-plunger carried by the driving-shaft-gear of the countershaft and engaging the screw-driver-shaft-gear on said countershaft, a member movable to vary the force of the plunger-spring and situated within the drill-shaft-gear upon the countershaft, and a screw threaded into the countershaft and engaging said member.

57. The combination with a frame, of a work-support mounted thereon, a casing mounted to reciprocate upon the frame, a drill-shaft and a screw-driver-shaft journaled in the casing, a driving shaft extending in the direction of reciprocation of the casing and from which the drill-shaft and screw-driver-shaft are rotated, and a lever fulcrumed upon the frame and connected to the casing to shift it during the rotation of the shaft between drill-shaft-presenting and screw-driver-shaft-presenting positions.

58. The combination with a frame, of a work-support, a casing co-operating with the work-support and having a projection movable longitudinally in the frame and an actuating projection, a lever fulcrumed upon the frame and having a cam-slot to receive the actuating projection and effect movement of the casing, and a drill-shaft and a screw-driver-shaft movable in the casing to operate in different positions thereof upon the supported work.

59. The combination with a frame, of a work-support, a casing co-operating with the work-support and having a projection movable longitudinally in the frame, a drill-shaft and a screw-driver-shaft rotatable in the casing and presented thereby for alternate operation, a driving shaft journaled in the frame and extending parallel to the casing-projection and into the casing, and means effective in the different positions of the casing for communicating the rotation of the driving shaft to the drill-shaft and screw-driver-shaft.

60. In a fastening-inserting machine, a work-support, a casing movable transversely of the support, a tool-shaft movable through the casing toward and from the work-support, and a unitary member connected to both the casing and the tool-shaft to effect their movements.

61. In a fastening-inserting machine, a work-support, a casing movable transversely of the support, a tool-shaft movable through the casing toward and from the work-support, a lever carrying a cam acting upon the casing to move it, and connections for moving the tool-shaft and including a link joined to the lever.

62. In a fastening-inserting machine, a work-support, a casing movable transversely of the support, a carrier movable in the casing, a drill-shaft movable by the carrier toward and from the supported work, a screw-driver-shaft movable through the carrier toward and from the supported work, and means for imparting such movements to the casing and shafts.

63. In a fastening-inserting machine, a work-support, a casing movable transversely of the support and having a projection, a carrier movable in the casing, a drill-shaft movable by the carrier toward and from the supported work, a screw-driver-shaft movable through the carrier toward and from the supported work, a slide reciprocating in the carrier and connected to the screw-driver-shaft, a lever provided with a cam-slot receiving the casing-projection, a link joining the lever to the slide, a lever for moving the carrier, and means for oscillating the levers.

64. In a screw-inserting machine, screw-inserting mechanism, a screw-feeder, a transferring device movable between the feeder and inserting mechanism, and members movable together to cause the delivery of a screw from the feeder and the delivery of another screw to the transferring device.

65. In a screw-inserting machine, screw-inserting mechanism, a screw-feeder, a transferring device movable between the feeder and inserting mechanism, and members movable together to cause the deivery of a screw from the feeder and the delivery of another screw to the transferring device, the member causing the delivery to the transferring device temporarily retaining the screw delivered from the feeder.

66. In a screw-inserting machine, screw-inserting mechanism, a screw-feeder provided with a retainer to which screws are supplied one by one, a raceway leading from the retainer, a nozzle terminating the raceway, a screw-transferring device movable between the nozzle and the inserting mechanism, and delivery-plungers respectively movable in the retainer and in the nozzle.

67. In a screw-inserting machine, screw-inserting mechanism, a screw-feeder provided with a retainer to which screws are supplied one by one, a raceway leading from the retainer, a nozzle terminating the raceway, a screw-transferring device movable between the nozzle and the inserting mechanism, delivery-plungers respectively movable in the retainer and in the nozzle, an actuating lever connected to each plunger, and means arranged to vary the normal relation between the levers.

68. In a screw-inserting machine, screw-inserting mechanism, a screw-feeder provided with a retainer to which screws are supplied one by one, a raceway leading from the retainer, a nozzle terminating the raceway, a screw-transferring device movable between the nozzle and the inserting mechanism, delivery-plungers respectively movable in the retainer and in the nozzle, an actuating lever connected to each plunger, and a screw threaded into one lever and contacting with the other.

69. In a screw-inserting machine, screw-inserting mechanism, a screw-feeder provided with a retainer to which screws are supplied one by one, a raceway leading from the retainer, a nozzle terminating the raceway, a screw-transferring device movable between the nozzle and the inserting mechanism, delivery-plungers respectively movable in the retainer and in the nozzle, and a spring by which the delivery-plungers are actuated.

70. In a screw-inserting machine, screw-inserting mechanism, a screw-feeder provided with a retainer to which screws are supplied one by one, a raceway leading from the retainer, a nozzle terminating the raceway, a screw-transferring device movable btween the nozzle and the inserting mechanism, delivery-plungers respectively movable in the retainer and in the nozzle, a spring by which the delivery-plungers are actuated, and means arranged to vary the force of the spring.

71. In a screw-inserting machine, screw-inment about its fulcrum, a spring normally holding the second intermediate lever at such a limit, and connections between the two intermediate levers and the pressure means.

101. In a fastening-inserting machine, a work-support, inserting mechanism for operating upon the supported work, a clutch through which the inserting mechanism is driven, a controlling lever for the clutch, a treadle depressible by the operator, connections between the treadle and the controlling member to cause the action of said controlling member upon retraction of the treadle, a member actuated by the treadle and contacting with the clutch-controlling member to cause the engagement of the clutch, a latch for the clutch-controlling member, a cam-shaft rotatable by the clutch and through which the inserting mechanism is actuated, and means actuated by the cam-shaft to release the clutch-controlling member from the latch.

102. In a fastening-inserting machine, a work-support, inserting mechanism for operating upon the supported work, a clutch through which the inserting mechanism is driven, a controlling lever for the clutch, a treadle depressible by the operator, connections between the treadle and the controlling member to cause the action of said controlling member upon retraction of the treadle, a member actuated by the treadle and contacting with the clutch-controlling member to cause the engagement of the clutch, a latch for the clutch-controlling member, a cam-shaft rotatable by the clutch and by which the inserting mechanism is actuated, and a member movable by the treadle-actuated member to permit the latch to retain the clutch-controlling member.

103. In a fastening-inserting machine, a work-support, inserting mechanism for operating upon the supported work, a clutch through which the inserting mechanism is driven, a controlling lever for the clutch, a treadle depressible by the operator, connections between the treadle and the controlling member to cause the action of said controlling member upon retraction of the treadle, a member actuated by the treadle and contacting with the clutch-controlling member to cause the engagement of the clutch, a latch for the clutch-controlling member, a cam-shaft rotatable by the clutch and by which the inserting mechanism is actuated, and a member movable by the treadle-actuated member to permit the latch to retain the clutch-controlling member and movable by the cam-shaft to release the clutch-controlling member from the latch.

104. In a fastening-inserting machine, a work-support, inserting mechanism for operating upon the supported work, a clutch through which the inserting mechanism is driven, a controlling lever for the clutch, a treadle depressible by the operator, connections between the treadle and the controlling member to cause the action of said controlling member upon retraction of the treadle, a member actuated by the treadle and contacting with the clutch-controlling member to cause the engagement of the clutch, a latch for the clutch-controlling member, a cam-shaft rotatable by the clutch and by which the inserting mechanism is actuated, a lever movable by the cam-shaft, and a link connected to the cam-shaft-lever for releasing the latch.

105. In a fastening-inserting machine, a work-support, inserting mechanism for operating upon the supported work, a clutch through which the inserting mechanism is driven, a controlling lever for the clutch, a treadle depressible by the operator, connections between the treadle and the controlling member to cause the action of said controlling member upon retraction of the treadle, a member actuated by the treadle and contacting with the clutch-controlling member to cause the engagement of the clutch, a latch for the clutch-controlling member, a cam-shaft rotatable by the clutch and by which the inserting mechanism is actuated, a lever movable by the cam-shaft, a link connected to the cam-shaft-lever for releasing the latch, and a member operable by the inserting mechanism for moving the cam-shaft-lever.

106. In a heel-attaching machine, a jack, drill mechanism and screw-driver mechanism co-operating with the jack, a rotatable cam-shaft, means for rotating the cam-shaft, and cams upon the shaft for actuating the drill mechanism and screw-driver mechanism and for disconnecting the rotating means from the cam-shaft.

107. In a heel-attaching machine, a jack, drill mechanism and screw-driver mechanism co-operating with the jack, a rotatable cam-shaft, means for rotating the cam-shaft, cams upon the shaft for actuating the drill mechanism and screw-driver mechanism and for disconnecting the rotating means from the cam-shaft, and means operable by the drill mechanism for disconnecting the rotating means from the cam-shaft.

108. In a fastening-inserting machine, fastening-inserting mechanism, means for delivering a fastening to the inserting mechanism, driving means by which an operating cycle is produced to effect in a predetermined order the insertion of a previously delivered fastening and the delivery of a fastening for insertion during the succeeding cycle, a member movable by the operator to initiate a complete delivering and inserting cycle, and means actuated by the machine to stop said machine during an operating cycle, this stopping occurring after the insertion of a fastening and before the delivery of the succeeding fastening.

109. In a fastening-inserting machine, fastening-inserting mechanism, means for delivering a fastening to the inserting mechanism, driving means by which an operating cycle of the machine is produced, stopping means for the driving means, and a rotatable member provided with portions arranged to actuate the stopping means successively during an operating cycle.

110. In a fastening-inserting machine, fastening-inserting mechanism, means for delivering a fastening to the inserting mechanism, driving means by which an operating cycle of the machine is produced, stopping means for the driving means and a rotatable member provided with two projections, the stopping means having two portions, one arranged to be engaged by one of the projections during each operating cycle and the other movable by the operator into position for engagement by the other projection.

111. In a fastening-inserting machine, fastening-inserting mechanism, means for delivering a fastening to the inserting mechanism, a clutch through which the machine is driven to produce an operating cycle, a rotatable shaft having cams by which the inserting mechanism and delivery means are actuated, and means for disconnecting the clutch and including a lever, there being two projections spaced from each other about the cam-shaft and arranged to actuate the lever.

112. In a fastening-inserting machine, fastening-inserting mechanism, means for delivering a fastening to the inserting mechanism, a clutch through which the machine is driven to produce an operating cycle, a rotatable shaft having cams by which the inserting mechanism and delivery means are actuated, and means for disconnecting the clutch and including a lever provided with a contact-projection movable by the operator into and out of active position, there being two projections spaced from each other about the camshaft and arranged to engage respectively the lever and its movable projections.

THOMAS H. SEELY.

CERTIFICATE OF CORRECTION.

Patent No. 2,174,601. October 3, 1939.

THOMAS H. SEELY.

It is hereby certified that error appears in the printed specification of the above numbered patent requiring correction as follows: Page 11, first column, line 60, claim 17, for the word "from" read for; page 15, second column, line 34, claim 82, for "wieldable" read yieldable; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.

CERTIFICATE OF CORRECTION.

Patent No. 2,174,601.  October 3, 1939.

THOMAS H. SEELY.

It is hereby certified that error appears in the printed specification of the above numbered patent requiring correction as follows: Page 11, first column, line 60, claim 17, for the word "from" read for; page 15, second column, line 34, claim 82, for "wieldable" read yieldable; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.